US012772293B2

(12) United States Patent
Lei et al.

(10) Patent No.: US 12,772,293 B2
(45) Date of Patent: Oct. 20, 2026

(54) DIRECTIONAL COLLISION HANDLING FOR NON-CELL-DEFINING SYNCHRONIZATION SIGNAL BLOCK

(71) Applicant: QUALCOMM Incorporated, San Diego, CA (US)

(72) Inventors: Jing Lei, San Diego, CA (US); Kazuki Takeda, Minato-ku (JP); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 18/618,768

(22) Filed: Mar. 27, 2024

(65) Prior Publication Data

US 2024/0357657 A1 Oct. 24, 2024

Related U.S. Application Data

(60) Provisional application No. 63/497,577, filed on Apr. 21, 2023.

(51) Int. Cl.
*H04W 74/0808* (2024.01)
*H04W 56/00* (2009.01)
*H04W 74/00* (2009.01)

(52) U.S. Cl.
CPC ..... *H04W 74/0825* (2013.01); *H04W 56/001* (2013.01); *H04W 74/002* (2013.01)

(58) Field of Classification Search
None
See application file for complete search history.

(56) References Cited

U.S. PATENT DOCUMENTS 12,457,592 B2 * 10/2025 Xiong .................... H04L 5/0094
2022/0360419 A1 11/2022 Cao et al.
2023/0147154 A1 * 5/2023 Cozzo ................. H04W 56/001 370/503

FOREIGN PATENT DOCUMENTS

WO 2023055631 A1 4/2023

OTHER PUBLICATIONS

Gaal P (Qualcomm Incorporated)., et al., "Reamining Issues on Procedures of RedCap UE", 3GPP TSG RAN WG1 Meeting #111, R1-2212086, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 5, 2022, 5 Pages, XP052222650, Sect. 3.

(Continued)

*Primary Examiner* — Hong S Cho
(74) *Attorney, Agent, or Firm* — QUALCOMM Incorporated

(57) ABSTRACT

Various aspects of the present disclosure generally relate to wireless communication. Some aspects generally relate to reducing interference in a user equipment (UE) with respect to non-cell defining synchronization signal and physical broadcast channel block (NCD-SSB) communications. Some aspects more specifically relate to configuring the UE to mitigate interference caused by collisions between the NCD-SSB and a cell-defining SSB (CD-SSB). Some aspects more specifically relate to configuring the UE to mitigate interference and/or other issues that might occur when at least a portion of the NCD-SSB is received during one or more downlink slots or symbols and one or more uplink slots or symbols.

20 Claims, 11 Drawing Sheets

(56) References Cited

OTHER PUBLICATIONS

International Search Report and Written Opinion—PCT/US2024/021904—ISA/EPO—Jul. 25, 2024.

Moderator (Ericsson): "FL Summary for Incoming LS (R1-2203046) on Introduction of an Offset to Transmit CD-SSB and NCD-SSB at Different Times", 3GPP TSG-RAN WG1 Meeting #109-e, R1-2205429, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, May 21, 2022, 17 Pages, XP052204244, Huawei, HiSilicon contribution, p. 4.

NTT Docomo Inc: "Discussion on Remaining Issues for RedCap UE", 3GPP TSG RAN WG1 #112bis-e, R1-2303690, 3rd Generation Partnership Project, Mobile Competence Centre, 650, Route Des Lucioles, F-06921 Sophia-Antipolis Cedex, France, vol. RAN WG1, No. e-Meeting, Apr. 17, 2023-Apr. 26, 2023, Apr. 7, 2023, 4 Pages, XP052353145, Sect.s 2.1, 2.2.

* cited by examiner

DIRECTIONAL COLLISION HANDLING FOR NON-CELL-DEFINING SYNCHRONIZATION SIGNAL BLOCK

CROSS-REFERENCE TO RELATED APPLICATION

This Patent Applications claims priority to U.S. Provisional Patent Application No. 63/497,577, filed on Apr. 21, 2023, entitled "DIRECTIONAL COLLISION HANDLING FOR NON-CELL-DEFINING SYNCHRONIZATION SIGNAL BLOCK," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for directional collision handling for non-cell-defining synchronization signal and physical broadcast channel block communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Signals transmitted by network components can sometimes interfere with signals transmitted by other network components. For example, signals intended for one network device may be received by a different network device. As another example, interference may occur when signals are received by a network device at an unexpected time or frequency. For example, receiving a non-cell defining synchronization signal and physical broadcast channel block (NCD-SSB) can lead to intra-cell or inter-cell interference, loss of synchronization, and radio link failures. Due to the periodic nature of NCD-SSBs after activation, these and potentially other issues may persist for reduced capability (RedCap) and non-RedCap UEs.

SUMMARY

Some aspects herein relate to an apparatus for wireless communication at a user equipment (UE). The UE may include at least one memory and at least one processor coupled with the at least one memory. The at least one processor may be operable to cause the UE to receive a first configuration for operating in a time division duplexing (TDD) band having one or more downlink (DL) slots or DL symbols and one or more uplink (UL) slots or UL symbols. The at least one processor may be operable to cause the UE to receive a second configuration for reception of a non-cell-defining synchronization signal and physical broadcast channel block (NCD-SSB) and directional collision handling associated with the NCD-SSB.

Some aspects herein relate to an apparatus for wireless communication at a network node. The network node may include at least one memory and at least one processor coupled with the at least one memory. The at least one processor may be operable to cause the network node to transmit a first configuration for operating in a TDD band having one or more DL slots or DL symbols and one or more UL slots or UL symbols. The at least one processor may be operable to cause the network node to transmit a second configuration for directional collision handling for an NCD-SSB.

Some aspects described herein relate to a method of wireless communication performed at a UE. The method may include receiving a first configuration for operating in a TDD band having one or more DL slots or DL symbols and one or more UL slots or UL symbols. The method may include receiving a second configuration for reception of an NCD-SSB and directional collision handling associated with the NCD-SSB.

Some aspects herein relate to a method of wireless communication performed at a network node. The method may include transmitting a first configuration for operating in a TDD band having one or more DL slots or DL symbols and one or more UL slots or UL symbols. The method may include transmitting a second configuration for directional collision handling for an NCD-SSB.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
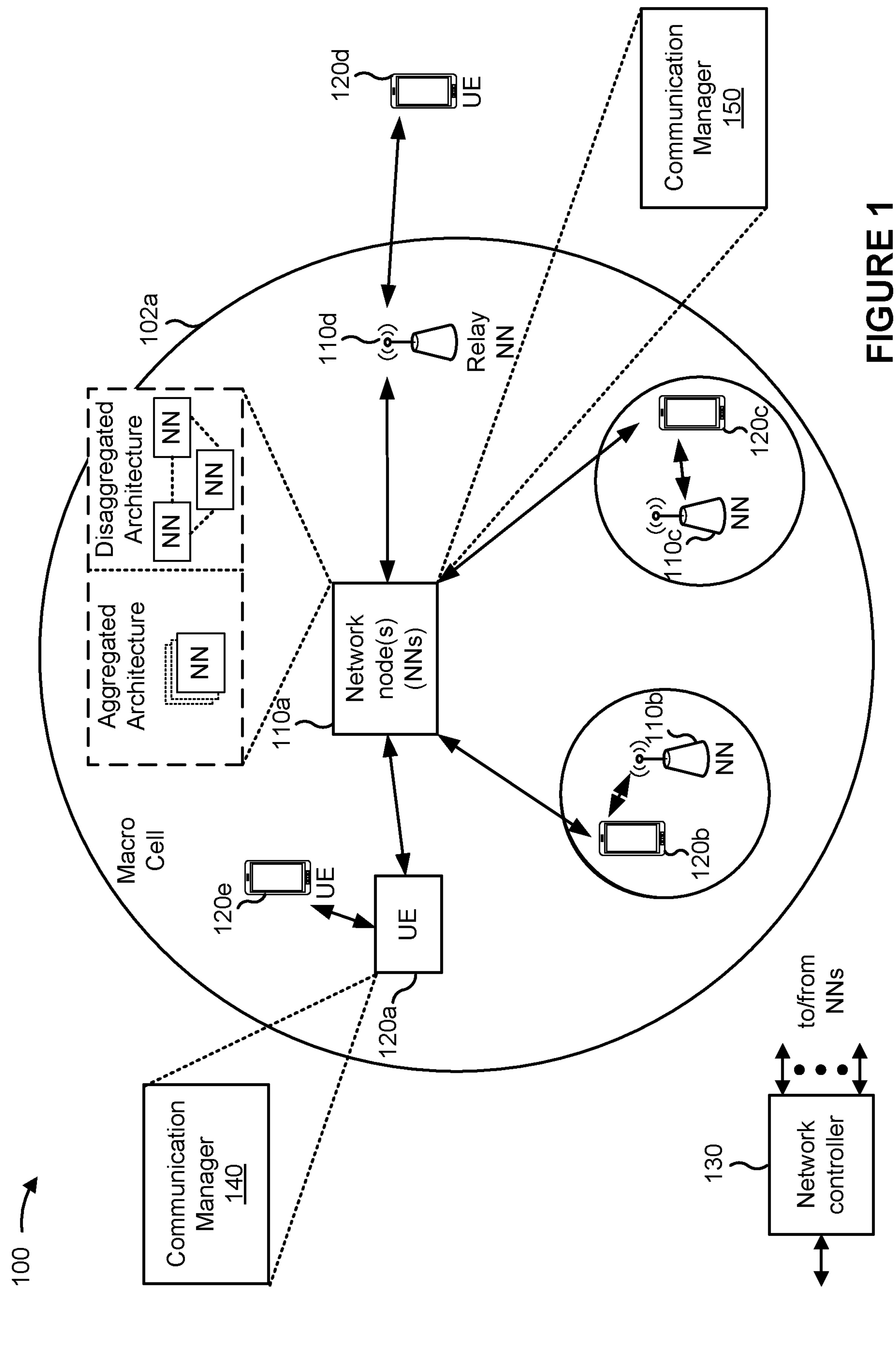
FIG. 1 is a diagram illustrating an example of a wireless network.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Certain network components transmit synchronization signal and physical broadcast channel (PBCH) blocks (SSBs), which help facilitate the initial access and synchronization processes for user equipments (UEs). SSBs generally consist of two components: the primary synchronization signal (PSS) and the secondary synchronization signal (SSS). SSBs provide for time-domain synchronization, frequency-domain synchronization, cell search and identification, system information acquisition, and network access.

One type of SSB is called a cell-defining SSB (CD-SSB). The CD-SSB includes the PSS, SSS, and cell identification information, which may include a cell identifier, frame timing, and system information. The cell identification information helps the UE distinguish between different cells in the network and establish a connection with the appropriate cell. When an SSB is not associated with a remaining minimum system information (RMSI) (e.g., system information block (SIB) 1 (SIB1)), the SSB is referred to as a non-Cell Defining SSB (NCD-SSB), which can be used to perform radio link monitoring (RLM), bidirectional forwarding detection (BFD), and radio resource management (RRM) measurements and measurements for resource allocation (RA) resource selection inside the active downlink (DL) bandwidth part (BWP) when the active BWP does not contain the CD-SSB. A UE may be configured with multiple SSBs provided that each BWP is configured with at most one SSB (e.g., CD-SSB or NCD-SSB). The NCD-SSB includes the PSS and SSS but omits the cell identification information. NCD-SSBs may help with redundancy, improving signal coverage, or assisting in network load balancing.

At the UE, the CD-SSB and NCD-SSB may "collide" when, for example, the NCD-SSB is transmitted on the same resources. Even if an offset is applied to the NCD-SSB transmission, the offset may result in the NCD-SSB being transmitted on an uplink (UL) resource. Without a proper configuration, the UE may not be equipped to process the NCD-SSB on the UL resource. Because NCD-SSB configurations are BWP specific, there is a significant likelihood that at least part of the NCD-SSB will be transmitted on a UL resource frequently enough to cause issues such as intra-cell interference, inter-cell interference, loss of synchronization, and/or radio link failures, among other examples. Moreover, due to the periodic nature of NCD-SSB transmissions, issues resulting from collisions may persist at the UE. Further, the broadcast of the NCD-SSB may be based on the same transmission parameters (such as power boosting parameters, beam sweeping parameters, etc.) as a CD-SSB, which can cause further collisions, and therefore cause interference, between the NCD-SSB and the CD-SSB from the perspective of the UE.

Various aspects relate generally to reducing interference in a UE with respect to NCD-SSB communications. Some aspects more specifically relate to configuring the UE to mitigate interference caused by collisions between the NCD-SSB and the CD-SSB. Some aspects more specifically relate to configuring the UE to mitigate interference and/or other issues that might occur when at least a portion of the NCD-SSB is received during one or more DL slots or symbols and one or more UL slots or symbols. In some aspects, the configuration may define parameters of NCD-SSB reception, such as a time offset between an NCD-SSB and a reference CD-SSB, periodicity of the NCD-SSB after activation, or priority indication for NCD-SSB reception. In some aspects, the configuration may define rules of collision handling associated with the NCD-SSB, such as validation for the NCD-SSB presence and validation for UL resources in the presence of NCD-SSBs.

Particular aspects of the subject matter described in this disclosure can be implemented to realize one or more of the following potential advantages. In some examples, the described techniques can be used to mitigate interference caused by receiving at least a portion of the NCD-SSB during one or more DL slots or symbols and one or more UL slots or symbols. For example, by configuring the UE for reception of the NCD-SSB and directional collision handling associated with the NCD-SSB, some aspects reduce the likelihood of issues such as intra-cell or inter-cell interference, loss of synchronization between the UE and a network node, and radio link failures. Further, in some aspects, by configuring the UE for reception of the NCD-SSB and directional collision handling associated with the NCD-SSB, persistent issues caused by the periodic nature of NCD-SSBs may be avoided or mitigated. For example, the UE may be configured to expect the NCD-SSB, at least partially, on UL resources. In another example, the time offset and/or periodicity of the NCD-SSB may be configured in a way that prevents the NCD-SSB from being transmitted during UL resources, which can mitigate intra-cell interference, inter-cell interference, loss of synchronization, and radio link failures caused by collisions. Moreover, the UE may be configured with rules that the UE can apply to validate the NCD-SSB in UL, DL, or flexible slots or symbols, thereby reducing the collisions between the NCD-SSB and the CD-SSB and mitigating potential interference that might be caused by such collisions.

FIG. 1 is a diagram illustrating an example of a wireless network. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses (for example, an augmented reality (AR), virtual reality (VR), mixed reality, or extended reality (XR) headset), a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium. Some UEs 120 (for example, UEs 120*a* and 120*c*) may communicate directly using one or more sidelink channels (for example, without a network node as an intermediary to communicate with one another).

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In some examples, two or more UEs 120 (for example, shown as UE 120*a* and UE 120*c*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol using, for example, a PC5 interface for direct communication, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110. In other examples, the two or more UEs 120 may communicate through a vehicle-to-network-to-vehicle (V2N2V) protocol, for example, by communicating through a Uu interface using the LTE and/or NR uplink and downlink.

In some aspects, the UE 120 may include a communication manager 140. As described in more detail elsewhere herein, the communication manager 140 may receive a first configuration for operating in a TDD band having one or more DL slots or DL symbols and one or more UL slots or UL symbols; and receive a second configuration for reception of an NCD-SSB and directional collision handling associated with the NCD-SSB. Additionally, or alternatively, the communication manager 140 may perform one or more other operations described herein.

In some aspects, the network node 110 may include a communication manager 150. As described in more detail elsewhere herein, the communication manager 150 may transmit a first configuration for operating in a TDD band having one or more DL slots or DL symbols and one or more UL slots or UL symbols; and transmit a second configuration for reception of an NCD-SSB and directional collision handling associated with the NCD-SSB. Additionally, or alternatively, the communication manager 150 may perform one or more other operations described herein.

Figure 2:
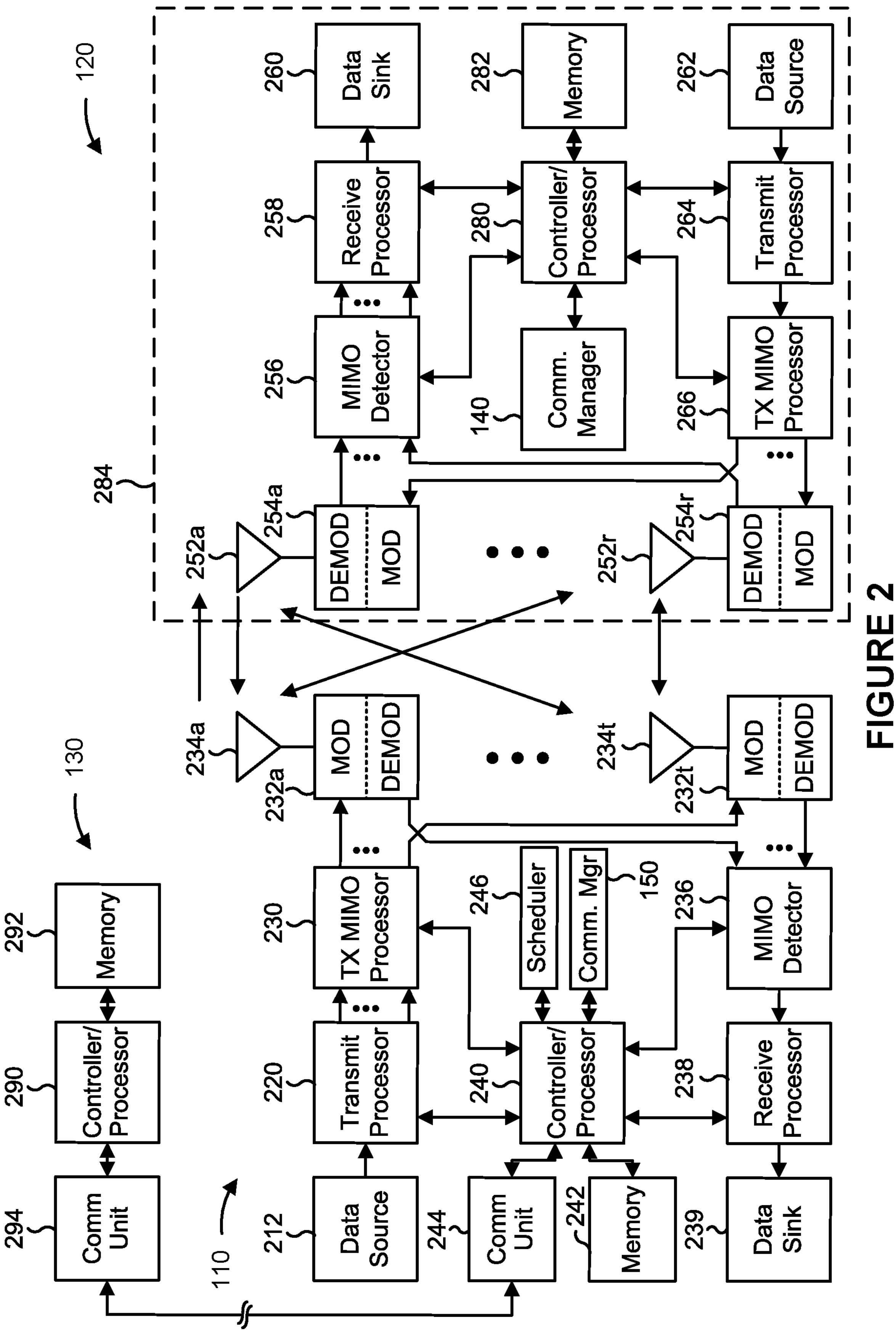
FIG. 2 is a diagram illustrating an example network node in communication with a user equipment (UE) in a wireless network.

FIG. 2 is a diagram illustrating an example network node in communication with a UE in a wireless network. The network node may correspond to the network node 110 of FIG. 1. Similarly, the UE may correspond to the UE 120 of FIG. 1. The network node 110 may be equipped with a set of antennas 234*a* through 234*t*, such as T antennas ($T \geq 1$). The UE 120 may be equipped with a set of antennas 252*a* through 252*r*, such as R antennas ($R \geq 1$). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a PSS or an SSS). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with reception of an NCD-SSB and directional collision handling associated with the NCD-SSB, as described in more detail elsewhere herein. For example, the controller/processor 240 of the network node 110, the controller/processor 280 of the UE 120, or any other component (s) of FIG. 2 may perform or direct operations of, for example, process 800 of FIG. 8, process 900 of FIG. 9, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, or other processes as described herein. In some examples, executing instructions may include running the instructions, converting the instructions, compiling the instructions, or interpreting the instructions, among other examples.

In some aspects, the UE 120 includes means for receiving a first configuration for operating in a TDD band having one or more DL slots or DL symbols and one or more UL slots or UL symbols; and means for receiving a second configuration for reception of an NCD-SSB and directional collision handling associated with the NCD-SSB. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting a first configuration for operating in a TDD band having one or more DL slots or DL symbols and one or more UL slots or UL symbols; and means for transmitting a second configuration for reception of an NCD-SSB and directional collision handling associated with the NCD-SSB. The means for the network node 110 to perform operations described herein may include, for example, one or more of communication manager 150, antenna 234, modem 232, MIMO detector 236, receive processor 238, transmit processor 220, TX MIMO processor 230, controller/processor 240, or memory 242.

Figure 3:
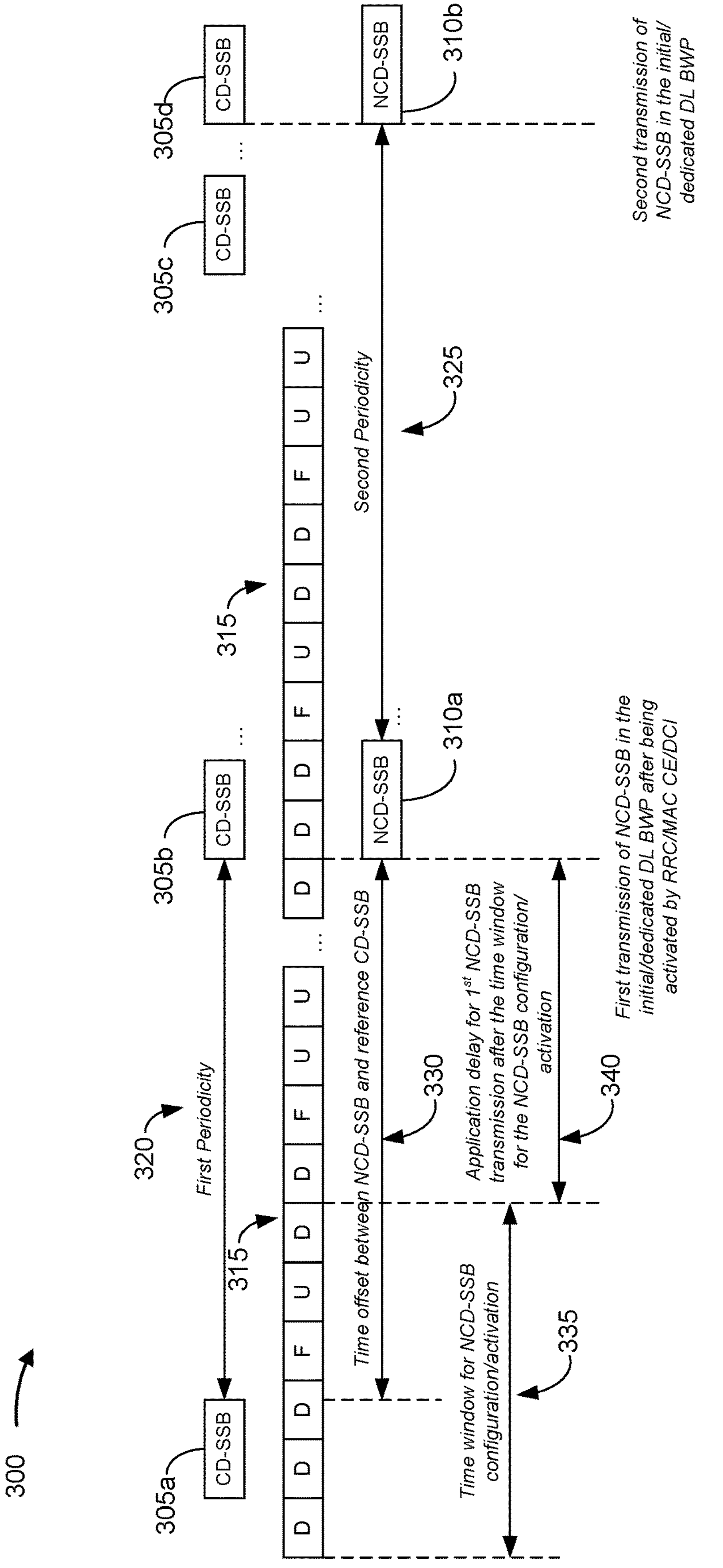
FIG. 3 is a diagram illustrating an example timeline for cell-defining synchronization signal and physical broadcast channel blocks (SSBs) (CD-SSBs) and non-cell-defining SSBs (NCD-SSBs) in a time division duplex band.

FIG. 3 is a diagram illustrating an example timeline 300 for CD-SSBs 305*a*-305*d* (collectively, 305) and NCD-SSBs 310*a*-310*b* (collectively, 310) in a time division duplex (TDD) band 315. As shown in FIG. 3, the TDD band 315 may include DL slots or symbols (shown as D), flexible slots or symbols (shown as F), and UL slots or symbols (shown as U). The UE 120 may receive a first configuration for operating in the TDD band 315. The example timeline 300 further illustrates a CD-SSB 305 and an NCD-SSB 310. The CD-SSB 305 may include a PSS, an SSS, and cell identification information. The NCD-SSB 310 may include the PSS and the SSS while omitting certain information about a particular network node 110. In some aspects, the UE 120 may receive a second configuration for reception of the NCD-SSB 310 and directional collision handling associated with the NCD-SSB 310. With the second configuration, the UE 120 may mitigate interference that would be caused by, for example, receiving some or part of the NCD-SSB 310 during DL slots or symbols and UL slots or symbols.

The CD-SSB 305 may be transmitted by a network node 110 on DL resources according to a first periodicity 320. The NCD-SSB 310 may be transmitted by the same or a different network node 110 according to a second periodicity 325. The second periodicity 325 may be a function of the first periodicity. For example, in some aspects, the second periodicity 325 is a multiple of the first periodicity (e.g., the first periodicity multiplied by an integer, k, where k is greater than or equal to zero). With the second periodicity 325 being a function of the first periodicity, particularly where k is zero or a positive integer, the NCD-SSB 310 will not be received by the UE 120 during a UL slot or symbols, thereby reducing interference and other issues.

In some aspects, the NCD-SSB 310 may be subject to a time offset 330. The time offset may shift a first of the NCD-SSBs 310*a* relative to a reference CD-SSB 305*a*. The NCD-SSB 310*a* and the reference CD-SSB 305*a* may be transmitted on the same cell (by the same network node) and have the same quasi co-location (QCL) relationship. As shown in FIG. 3, the time offset 330 is equal to the first periodicity 320. In some aspects, the time offset 330 may be a function of the first periodicity 320. The first transmission of the NCD-SSB 310*a* in an initial or dedicated DL BWP may occur after the time offset 330.

In some aspects, the second configuration defines a time window 335 for configuring or activating the NCD-SSB 310*a*. In some aspects, the NCD-SSB 310*a* may be activated by radio resource control (RRC) signaling, medium access control (MAC) control element (MAC-CE) signaling, downlink control information (DCI) signaling, and/or a combination thereof, among other examples. Accordingly, with the second configuration, the UE 120 may be configured to expect the NCD-SSB 310*a* to occur after the time window 335. In some aspects, the second configuration may define an application delay 340, which may indicate a period of time after the time window 335 in which the UE 120 may expect the first occasion of the NCD-SSB 310*a*.

As shown in the example timeline 300, a UE 120 operating on the TDD band 315 receives an indication of the presence of the NCD-SSB 310 in an active DL BWP, and the UE 120 may not expect the symbols of the NCD-SSB 310 to be configured as UL symbols by a cell-specific TDD-UL-DL-Pattern, a UE-specific TDD-UL-DL-Pattern, a DCI (scheduling DCI or a slot format indicator (SFI)), or a MAC-CE (e.g., a random access response (RAR)). In some aspects, the active DL BWP can be an initial DL BWP of the UE after releasing an RRC connection or a dedicated RRC within a dedicated DL BWP of the UE with RRC connection. For example, the NCD-SSB 310 in the initial DL BWP can be configured by the last serving cell in an RRCRelease message.

In some aspects, the collision avoidance between the NCD-SSB 310 on the DL slots or symbols and the UL slots or symbols can be achieved by restricting the configurations of candidate time offsets for NCD-SSB 310. For example, as discussed above, the candidate time offset between the NCD-SSB 310 and the CD-SSB 305 transmitted by the same cell (e.g., network node 110) may be configured as k times the periodicity of the CD-SSB 305, where k is zero or an integer greater than zero.

In some aspects, the time window 335 for the NCD-SSB configuration and/or activation, an application delay 340 for an NCD-SSB configuration and/or activation, or a reference CD-SSB 305*a* associated with a time offset configuration for the NCD-SSB 310 can be additionally provided to UE 120 by the network node 110. In some aspects, the application delay 340 for the NCD-SSB configuration and/or activation may depend on a frequency range, a reference numerology of the active DL BWP, a BWP switching delay, or capabilities of the UE 120.

Figure 4:
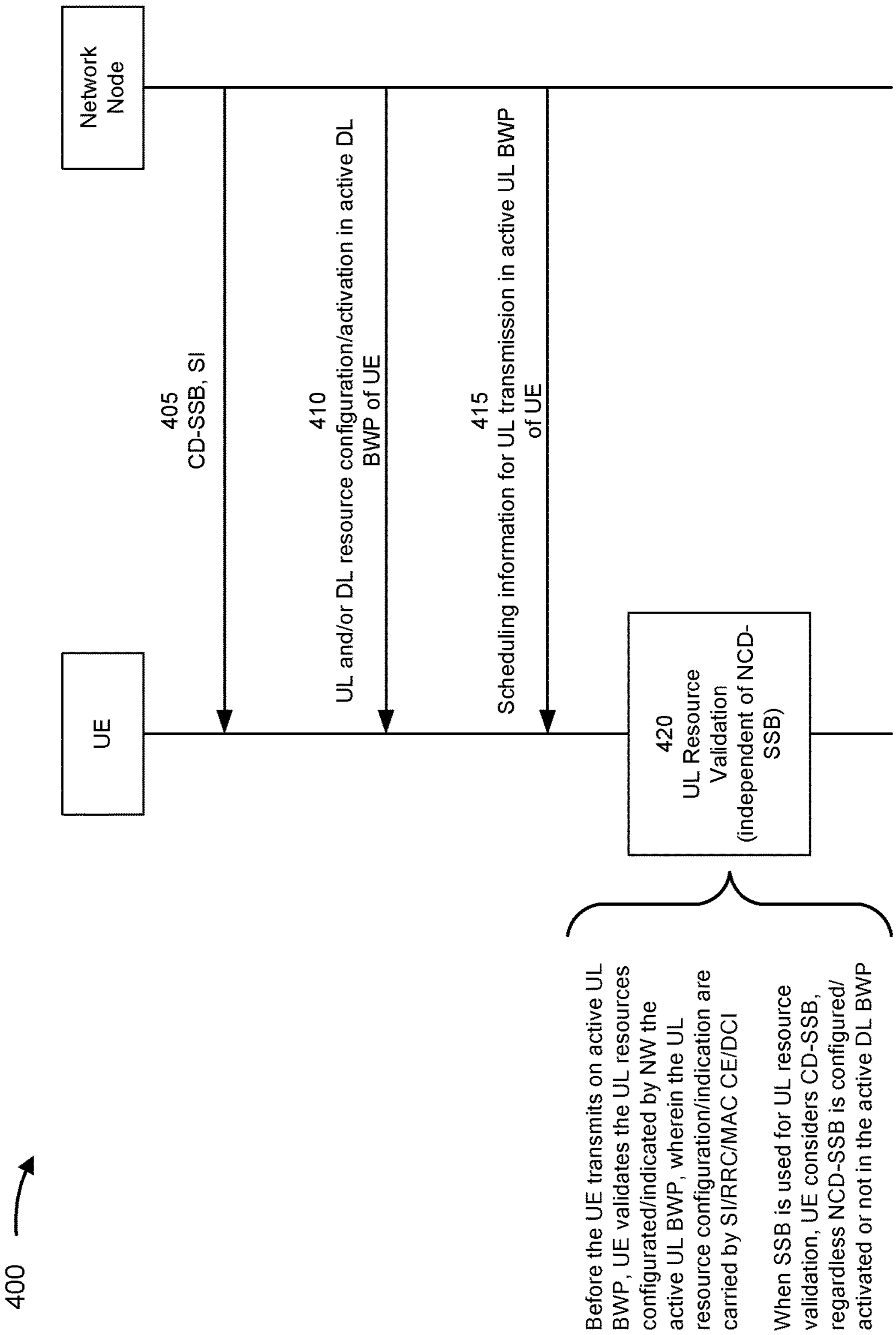
FIG. 4 is an example associated with uplink resource validation to avoid or mitigate collisions associated with an NCD-SSB.

FIG. 4 is an example 400 associated with UL resource validation to avoid or mitigate collisions associated with an NCD-SSB. The example 400 includes communications between a UE (such as UE 120) and a network node (such as network node 110).

As shown by reference number 405, the network node may transmit, and the UE may receive, a CD-SSB communication, system information, and/or a combination thereof, among other examples.

As shown by reference number 410, the network node may transmit, and the UE may receive, UL and/or DL resource configurations and/or activations in the active DL BWP of the UE.

As shown by reference number 415, the network node may transmit, and the UE may receive, scheduling information for UL transmission in the active UL BWP for the UE.

As shown by reference number 420, the UE may validate UL resources. In some aspects, the UE may validate the UL resources independently of the NCD-SSB. For example, before the UE transmits on the active UL BWP, the UE may validate the UL resources configurated/indicated by the network node on the active UL BWP. The UL resource configuration/indication may be carried by system information, RRC signaling, MAC-CE, DCI, and/or a combination thereof, among other examples. When the SSB is used for UL resource validation, UE may consider the CD-SSB, regardless of whether or not the NCD-SSB is configured/activated in the active DL BWP In some aspects, if a UE (such as a RedCap or non-RedCap UE) operating on the TDD band receives an indication of the presence of the NCD-SSB in an active DL BWP, and the UE is configured with a set of valid UL resources not overlapping with CD-SSB, the UE may not expect the NCD-SSB to be present on the set of valid UL resource as well as $N_{gap}$ number of symbols (discussed in greater detail below) before the first symbol/slot of the set of valid UL resource. In some aspects, for a RedCap UE in TDD, the network (such as wireless network 100) may ensure that the NCD-SSB time domain location is a subset of the time domain location of CD-SSB. The CD-SSB and NCD-SSB may be transmitted by the serving cell while the CD-SSB may be transmitted via the active DL BWP containing the NCD-SSB. The set of valid UL resources may be associated with a transmit occasion/opportunity for a UL channel (e.g., physical random access channel (PRACH), physical uplink shared channel (PUSCH), physical uplink control channel (PUCCH), sounding reference signal (SRS)), and the transmit occasion/opportunity may span one or multiple slots or sub-slots (e.g., the time duration of a sub-slot may be a fraction of a slot (e.g., Type-B PUSCH mapping)). The set of valid UL resources may be configured by system information or RRC signaling, which can be indicated to the UE by system information, RRC signaling, MAC-CE signaling, DCI signaling.

The set of valid UL resources may be configured to start at least $N_{gap}$ number of symbols after a last CD-SSB block transmitted by the serving cell. The value for $N_{gap}$ may be configurable by the network node and may depend on the frequency range, the duplex mode (TDD, sub-band full duplex (SBFD), high definition frequency division duplexing (HD-FDD)), the reference numerology of the active DL and/or UL BWP, and/or the type, format, or waveform of the UL channel (e.g., PRACH, PUSCH, PUCCH, SRS) associated with the set of valid UL resources. The active DL BWP can be an initial DL BWP of the UE after releasing an RRC connection or a dedicated DL BWP of the UE with an RRC connection (e.g., operating in an RRC connected mode). For example, for the UE without an RRC connection, the NCD-SSB may be configured by the last serving cell in an RRC release message. In some aspects, for a RedCap UE indicating a capability to use an initial DL BWP that includes the SSBs (e.g., SS/PBCH blocks) provided by NonCellDefiningSSB for PUSCH transmission in an RRC_INACTIVE state, if the UE is provided NonCellDefiningSSB in ncd-SSB-RedCapInitialBWP-SDT, then during a PUSCH transmission in the RRC_INACTIVE state the UE may use the SS/PBCH blocks provided by NonCellDefiningSSB for the purposes for which the UE would otherwise have used the SS/PBCH blocks that the UE used to obtain SIB1.

In some aspects, the UE may receive an indication of the presence and/or activation of the NCD-SSB by RRC signaling, MAC-CE signaling, or DCI signaling. In some aspects, if the active DL BWP provided by BWP-DownlinkDedicated, or the initial DL BWP provided during a procedure of PUSCH transmission in an RRC_INACTIVE state, includes the SS/PBCH blocks provided by NonCellDefiningSSB, the SS/PBCH blocks and the SS/PBCH blocks that the UE used to obtain SIB1 have the same QCL properties if they have the same index.

Figure 5:
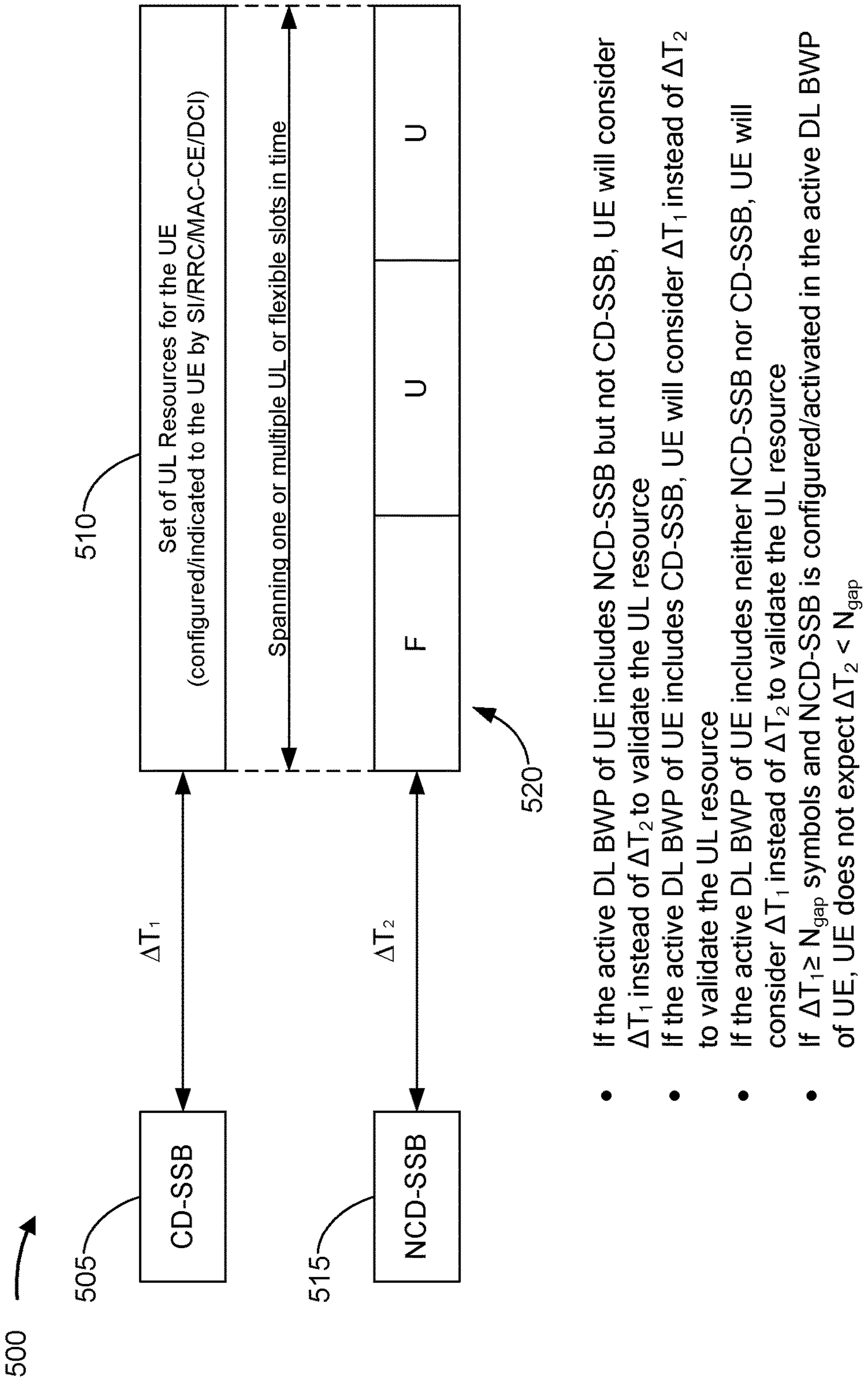
FIG. 5 is an example associated with uplink resource validation based on one or more timing gaps.

FIG. 5 is an example 500 associated with UL resource validation based on one or more timing gaps. A first timing gap $\Delta T_1$ may be defined between the last slot or symbol of the CD-SSB transmission 505 and a first slot or symbol of a set of UL resources 510 for the UE 120. A second timing gap $\Delta T_2$ may be defined between a last slot or symbol of the NCD-SSB 515 and a first slot or symbol of a flexible (shown as F) or UL (shown as U) resource 520. In some aspects, if the active DL BWP of the UE 120 includes the NCD-SSB 515 but not the CD-SSB transmission 505, the UE 120 may consider the first timing gap $\Delta T_1$ instead of the second timing gap $\Delta T_2$ to validate the UL resource. If the active DL BWP of the UE 120 includes the CD-SSB transmission 505, the UE 120 may consider the first timing gap $\Delta T_1$ instead of the second timing gap $\Delta T_2$ to validate the UL resource 520. If the active DL BWP of the UE 120 includes neither the NCD-SSB 515 nor the CD-SSB transmission 505, the UE 120 may consider the first timing gap $\Delta T_1$ instead of the second timing gap $\Delta T_2$ to validate the UL resource 520. In some aspects, if the first timing gap $\Delta T_1$ is greater than or equal to $N_{gap}$ symbols, and the NCD-SSB 515 is configured and/or activated in the active DL BWP of the UE 120, the UE 120 may not expect the second timing gap $\Delta T_2$ to be less than $N_{gap}$.

Figure 6:
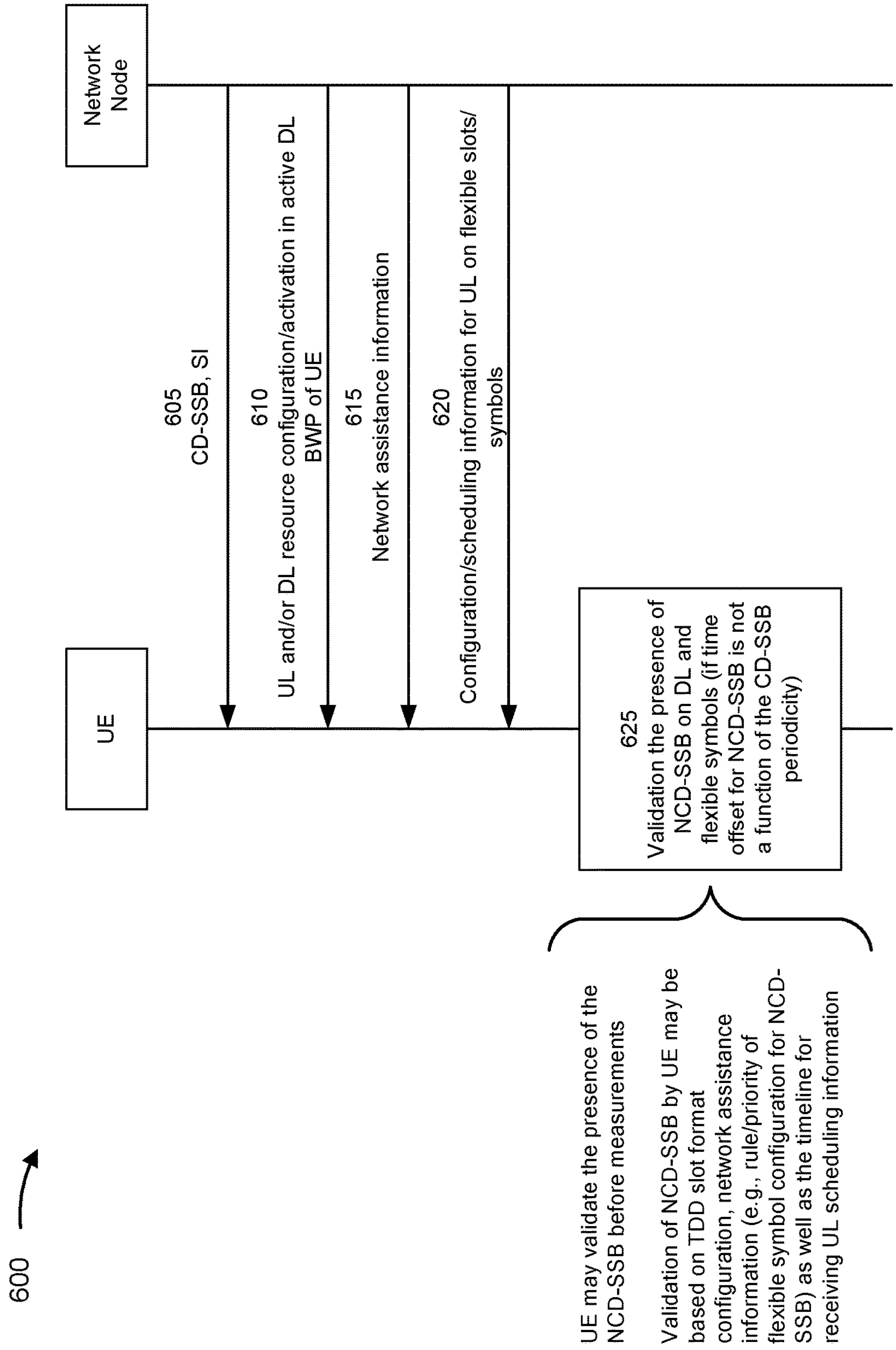
FIG. 6 is an example associated with validating the presence of the NCD-SSB on downlink and flexible slots or symbols.

FIG. 6 is an example 600 associated with validating the presence of the NCD-SSB on DL and flexible slots or symbols. The example 600 includes communications between a UE (such as UE 120) and a network node (such as network node 110).

As shown by reference number 605, the network node may transmit, and the UE may receive, a CD-SSB communication, system information, and/or a combination thereof, among other examples.

As shown by reference number 610, the network node may transmit, and the UE may receive, UL and/or DL resource configurations and/or activations in the active DL BWP of the UE.

As shown by reference number 615, the network node may transmit, and the UE may receive, network assistance information. The network assistance information may include SIBs, neighboring cell information, location assistance information, a timing advance parameter, and/or other parameters or settings associated with network performance such as, for example, power control settings, transmission modes, or adaptive modulation and coding schemes, among other examples.

As shown by reference number 620, the network node may transmit, and the UE may receive, configuration and/or scheduling information for UL transmissions on flexible slots or symbols.

As shown by reference number 625, the UE may validate the presence of the NCD-SSB on DL and/or flexible slots or symbols. In some aspects, the UE may validate the presence of the NCD-SSB in instances when the time offset for the NCD-SSB is not a function (e.g., a multiple) of the periodicity of the CD-SSB, discussed above. In some aspects, the UE may validate the presence of the NCD-SSB before performing a measurement of the NCD-SSB. The validation of the NCD-SSB by the UE may be based on a TDD slot format configuration, the network assistance information (e.g., a rule and/or priority of flexible symbol configurations for the NCD-SSB), as well as the timeline for receiving the UL scheduling information.

In some aspects, if the UE operating on the TDD band receives an indication of the presence of the NCD-SSB in an active DL BWP and the condition for the time offset of the NCD-SSB is not satisfied (e.g., the time offset for the NCD-SSB is not equal to k times the periodicity of the CD-SSB), the UE may be configured to validate the presence of the NCD-SSB within a period of time before measuring the validated symbols of the NCD-SSB. In some aspects, the UE may not expect the symbols of the NCD-SSB to be present on symbols configured as UL symbols by a cell-specific TDD-UL-DL-Pattern (in system information) or a UE-specific TDD-UL-DL-Pattern (via RRC), and will not receive the NCD-SSB on the UL symbols configured by the system information or the RRC signaling. For example, UL symbols in a TDD slot may not be valid for reception and/or measurement of the NCD-SSB.

If the UE is configured by RRC to receive the NCD-SSB on the set of flexible symbols of a TDD slot, the network node may provide additional information to assist the UE with validating for reception of the NCD-SSB. For example, if the flexible symbols are configured by RRC or indicated by SFI, the network node may provide a priority flag for the UE in system information or RRC signaling, and the priority flag may instruct the UE with whether or not to receive the NCD-SSB on the set of flexible symbols. On the same cell, the priority flag for the reception of the NCD-SSB on the flexible symbols configured by RRC may be different from the priority flag for the reception of the NCD-SSB on the flexible symbols indicated by the SFI.

In some aspects, if the UE is indicated by DCI and/or a MAC-CE to receive the NCD-SSB on a set of DL and flexible symbols of a TDD slot, the network node may specify a deterministic rule or provide a gap threshold to assist with validation by the UE. For example, the UE may be configured by the network node to receive or skip the NCD-SSB on the set of flexible symbols. Alternatively, if the time duration (e.g., a third timing gap $\Delta T_3$) between the last symbol of the DCI (e.g., physical downlink control channel (PDCCH)) or MAC-CE (e.g., physical downlink shared channel (PDSCH)) and the first symbol of the candidate NCD-SSB block is greater than or equal to a gap threshold, the UE may be configured to receive the NCD-SSB. Otherwise, the UE may not receive the NCD-SSB.

Figure 7:
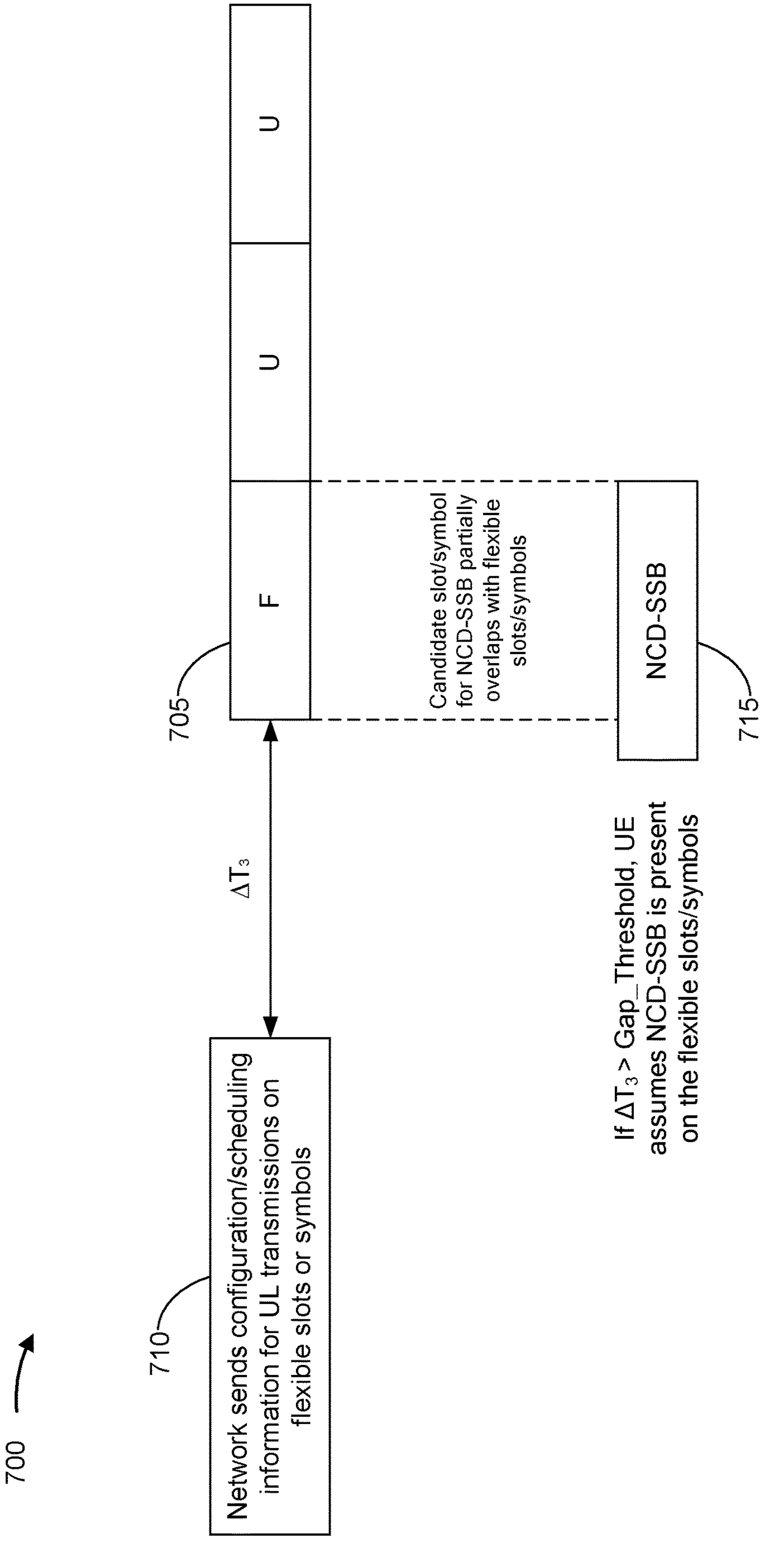
FIG. 7 is an example associated with resource validation on flexible slots or symbols based on a timing gap.

FIG. 7 is an example 700 associated with resource validation on flexible slots or symbols 705 based on a timing gap. As shown by reference number 710, the network node may transmit a configuration and/or scheduling information for UL transmissions on flexible slots or symbols 705. The configuration and/or scheduling information may be transmitted prior to the first flexible slot or symbol 705. The third timing gap $\Delta T_3$ may be defined between the last slot or symbol of the configuration and/or scheduling information 710 and the first flexible slot or symbol 705. If the third timing gap $\Delta T_3$ is greater than a gap threshold, the UE may be configured to expect that the NCD-SSB 715 is present on the flexible slots or symbols 705. In some aspects, as shown in the example 700 of FIG. 7, the candidate slot or symbol for the NCD-SSB 715 may at least partially overlap the flexible slots or symbols 705.

Figure 8:
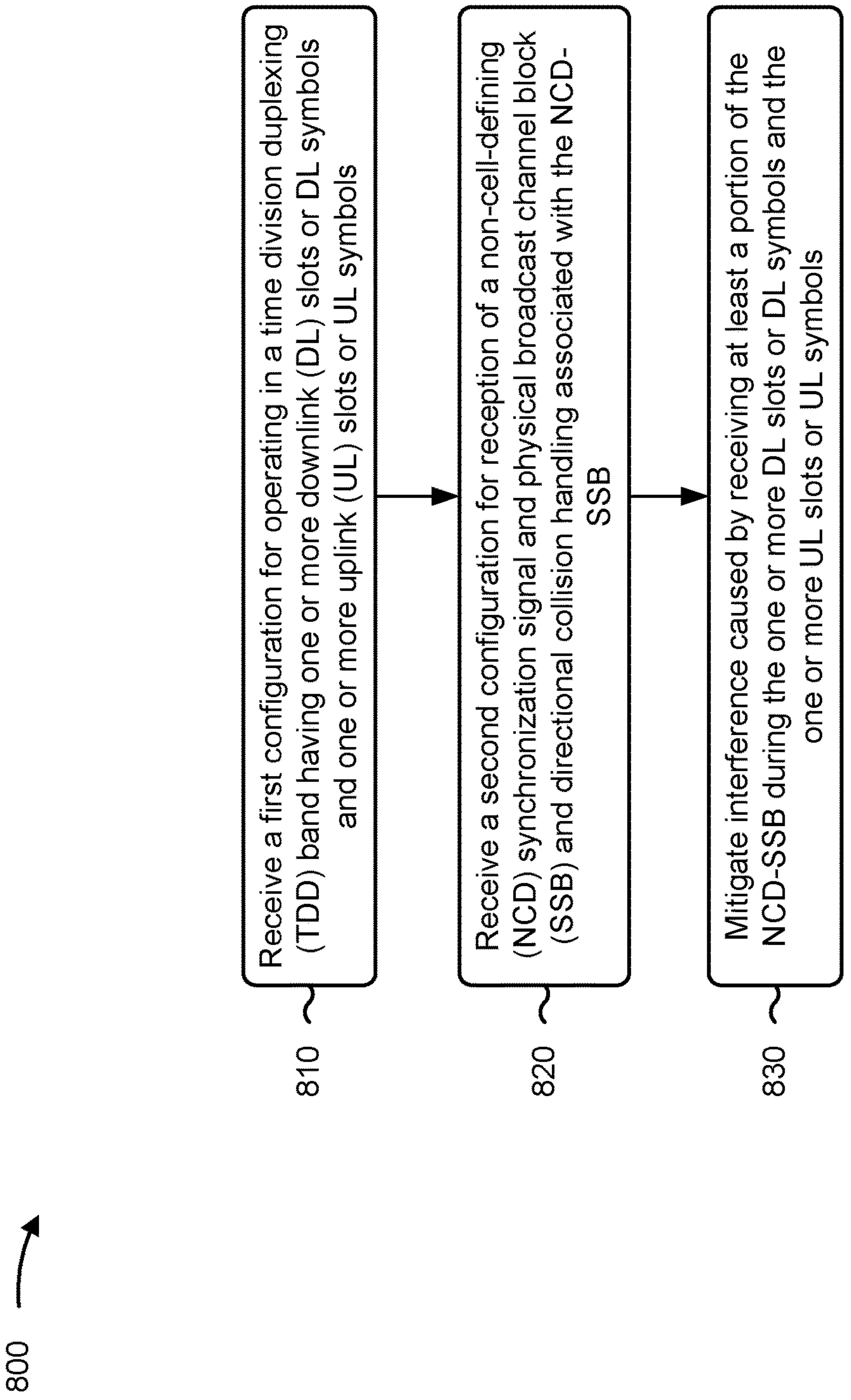
FIG. 8 is a flowchart illustrating an example process performed, for example, by a UE that supports directional collision handling for NCD-SSBs.

FIG. 8 is a flowchart illustrating an example process 800 performed, for example, at or by a UE that supports directional collision handling for NCD-SSBs. Example process 800 is an example where the UE (for example, UE 120 or an apparatus of the UE) performs operations associated with directional collision handling for NCD-SSBs.

As shown in FIG. 8, in some aspects, process 800 may include receiving a first configuration for operating in a TDD band having one or more DL slots or DL symbols and one or more UL slots or UL symbols (block 810). For example, the UE (such as by using communication manager 140 or reception component 1002, depicted in FIG. 10) may receive the first configuration for operating in the TDD band having the one or more DL slots or DL symbols and the one or more UL slots or UL symbols, as described above.

As further shown in FIG. 8, in some aspects, process 800 may include receiving a second configuration for reception of an NCD-SSB and directional collision handling associated with the NCD-SSB (block 820). For example, the UE (such as by using communication manager 140 or reception component 1002, depicted in FIG. 10) may receive the second configuration for reception of an NCD-SSB and directional collision handling associated with the NCD-SSB, as described above.

As further shown in FIG. 8, in some aspects, process 800 may include mitigating interference caused by receiving at least a portion of the NCD-SSB during the one or more DL slots or symbols and the one or more UL slots or symbols (block 830). For example, the UE (such as by using communication manager 140 or mitigation component 1008, depicted in FIG. 10) may mitigate interference caused by receiving at least a portion of the NCD-SSB during the one or more DL slots or symbols and the one or more UL slots or symbols, as described above.

Process 800 may include additional aspects, such as any single aspect or any combination of aspects described below or in connection with one or more other processes described elsewhere herein.

In a first additional aspect, the second configuration for reception of the NCD-SSB includes a timing offset between the NCD-SSB and a reference CD-SSB, a periodicity of the NCD-SSB, a frequency mapping for the NCD-SSB, a time window for NCD-SSB configuration or activation signaling reception, or an application delay of the reception of the NCD-SSB after the time window.

In a second additional aspect, alone or in combination with one or more of the first aspect, the timing offset is a function of a periodicity of the reference CD-SSB.

In a third additional aspect, alone or in combination with one or more of the first and second aspects, the timing offset is the periodicity of the reference CD-SSB multiplied by an integer greater than or equal to zero.

In a fourth additional aspect, alone or in combination with one or more of the first through third aspects, the NCD-SSB is associated with an active DL BWP.

In a fifth additional aspect, alone or in combination with one or more of the first through fourth aspects, the active DL BWP is an initial DL BWP of the UE after releasing an RRC connection or a dedicated DL BWP associated with an RRC connected mode of the UE.

In a sixth additional aspect, alone or in combination with one or more of the first through fifth aspects, the NCD-SSB is configured by a last serving cell after releasing a radio resource control connection.

In a seventh additional aspect, alone or in combination with one or more of the first through sixth aspects, process 800 includes receiving an indication of a presence or activation of the NCD-SSB in an active DL bandwidth part of the UE.

In an eighth additional aspect, alone or in combination with one or more of the first through seventh aspects, the indication of the presence or activation of the NCD-SSB is received via RRC signaling, MAC-CE signaling, or DCI.

In a ninth additional aspect, alone or in combination with one or more of the first through eighth aspects, process 800 includes receiving a network configuration for one of a time window, an application delay, or a reference CD-SSB associated with a time offset configuration, wherein the time window, the application delay, or the reference CD-SSB is associated with the presence or activation of the NCD-SSB.

In a tenth additional aspect, alone or in combination with one or more of the first through ninth aspects, the application delay is based, at least in part, on one or more of a frequency range, a reference numerology of an active DL BWP, a BWP switching delay, or a UE capability.

In an eleventh additional aspect, alone or in combination with one or more of the first through tenth aspects, process 800 including receiving a CD-SSB and SIBs output by a serving cell, receiving one or more of a UL resource configuration or UL activation or a DL resource configuration or DL activation in an active DL BWP, and receiving scheduling information for UL transmissions in an active UL BWP, wherein the second configuration for directional collision handling associated with the NCD-SSB includes a set of rules for validating a resource in the active UL BWP and for transmitting a UL reference signal or a UL channel on the active UL BWP after validating the UL resource allocated for the UL reference signal or the UL channel.

In a twelfth additional aspect, alone or in combination with one or more of the first through eleventh aspects, the second configuration for directional collision handling associated with the NCD-SSB includes a set of rules for providing a gap between a first symbol or slot of a set of valid UL resources and a last symbol or slot of a DL reference signal or DL channel.

In a thirteenth additional aspect, alone or in combination with one or more of the first through twelfth aspects, process 800 includes receiving a CD-SSB outside a first active DL bandwidth part including the NCD-SSB, receiving the CD-SSB outside a second active DL BWP not including the NCD-SSB, or receiving the NCD-SSB in a third active DL BWP including the NCD-SSB.

In a fourteenth additional aspect, alone or in combination with one or more of the first through thirteenth aspects, the first configuration for operating in the TDD band includes a set of valid UL resources associated with a transmit occasion or opportunity for a UL reference signal or UL channel, wherein the transmit occasion or opportunity spans one or more slots or sub-slots.

In a fifteenth additional aspect, alone or in combination with one or more of the first through fourteenth aspects, the set of valid UL resources is configured by system information or radio resource control signaling.

In a sixteenth additional aspect, alone or in combination with one or more of the first through fifteenth aspects, a presence or activation for the set of valid UL resources is indicated to the UE by system information, RRC, MAC-CE, or DCI signaling.

In a seventeenth additional aspect, alone or in combination with one or more of the first through sixteenth aspects, the set of valid UL resources starts after a last CD-SSB block transmitted by a serving cell, and a number of symbols between the last CD-SSB block and the set of valid UL resources is greater than or equal to a size of the gap.

In an eighteenth additional aspect, alone or in combination with one or more of the first through seventeenth aspects, a size of the gap is based, at least in part, on one or more of a frequency range, a duplex mode, a reference numerology of an active DL or UL bandwidth part, or a type, format, or waveform of a UL channel associated with the set of valid UL resources.

In a nineteenth additional aspect, alone or in combination with one or more of the first through eighteenth aspects, the second configuration for directional collision handling associated with the NCD-SSB includes a set of rules for applying a first timing offset or a second timing offset, wherein the first timing offset is a time between a last slot or symbol of a CD-SSB received from a serving cell and a first slot or symbol of a set of UL resources transmitted by the UE in an active UL BWP, and wherein the second timing offset is a time between a last slot or symbol associated with the NCD-SSB received from the serving cell in an active DL BWP and a first symbol of a flexible slot or a first symbol of a UL slot transmitted by the UE in the active UL BWP.

In a twentieth additional aspect, alone or in combination with one or more of the first through nineteenth aspects, the first timing offset is applied for UL resource validation in the active UL BWP as a result of an active DL BWP including the NCD-SSB and not a CD-SSB, the active DL BWP including the CD-SSB, or the active DL BWP not including either the NCD-SSB nor the CD-SSB.

In a twenty-first additional aspect, alone or in combination with one or more of the first through twentieth aspects, the first timing offset is applied as a result of the first timing offset being greater than or equal to a size of a gap between a first symbol or slot of a set of valid UL resources in the active UL BWP and a last symbol or slot of a set of valid DL resources, and further as a result of the NCD-SSB being configured or activated in an active downlink bandwidth part.

In a twenty-second additional aspect, alone or in combination with one or more of the first through twenty-first aspects, the second configuration for directional collision handling associated with the NCD-SSB includes a set of rules for validating a presence of the NCD-SSB in an active DL BWP before performing a measurement of the NCD-SSB on validated symbols of the NCD-SSB.

In a twenty-third additional aspect, alone or in combination with one or more of the first through twenty-second aspects, validating the presence of the NCD-SSB comprises validating the presence of the NCD-SSB based, at least in part, on one or more of the first configuration for operating in the TDD band or a timeline for receiving uplink scheduling information.

In a twenty-fourth additional aspect, alone or in combination with one or more of the first through twenty-third aspects, process 800 includes receiving a cell-defining SSB, receiving one or more of a UL configuration or activation or a DL configuration or DL activation in an active DL BWP, and receiving network assistance information, wherein the first configuration for operating in the TDD band includes at least a cell-specific, group-specific, or UE-specific slot pattern indication for DL, UL and flexible slots or symbols and a set of rules or scheduling information for UL communications on a set of UL slots or symbols and flexible symbols or slots.

In a twenty-fifth additional aspect, alone or in combination with one or more of the first through twenty-fourth aspects, process 800 includes receiving a priority flag permitting or not permitting UE reception of the NCD-SSB on the set of flexible symbols or slots.

In a twenty-sixth additional aspect, alone or in combination with one or more of the first through twenty-fifth aspects, the priority flag is received via one or more of RRC signaling, MAC-CE, or SFI signaling.

In a twenty-seventh additional aspect, alone or in combination with one or more of the first through twenty-sixth aspects, process 800 includes receiving the NCD-SSB on one or more of a set of DL slots or symbols, or a set of flexible slots or symbols, based, at least in part, on one or more of an indication of a priority flag, RRC signaling, MAC-CE signaling, or DCI signaling.

In a twenty-eighth additional aspect, alone or in combination with one or more of the first through twenty-seventh aspects, process 800 including receiving an instruction to receive or skip reception of the NCD-SSB on the set of flexible slots or symbols.

In a twenty-ninth additional aspect, alone or in combination with one or more of the first through twenty-eighth aspects, receiving the NCD-SSB is a result of a time duration between a last symbol of DCI or MAC-CE and a first symbol of a candidate NCD-SSB block being greater than or equal to a threshold.

Figure 9:
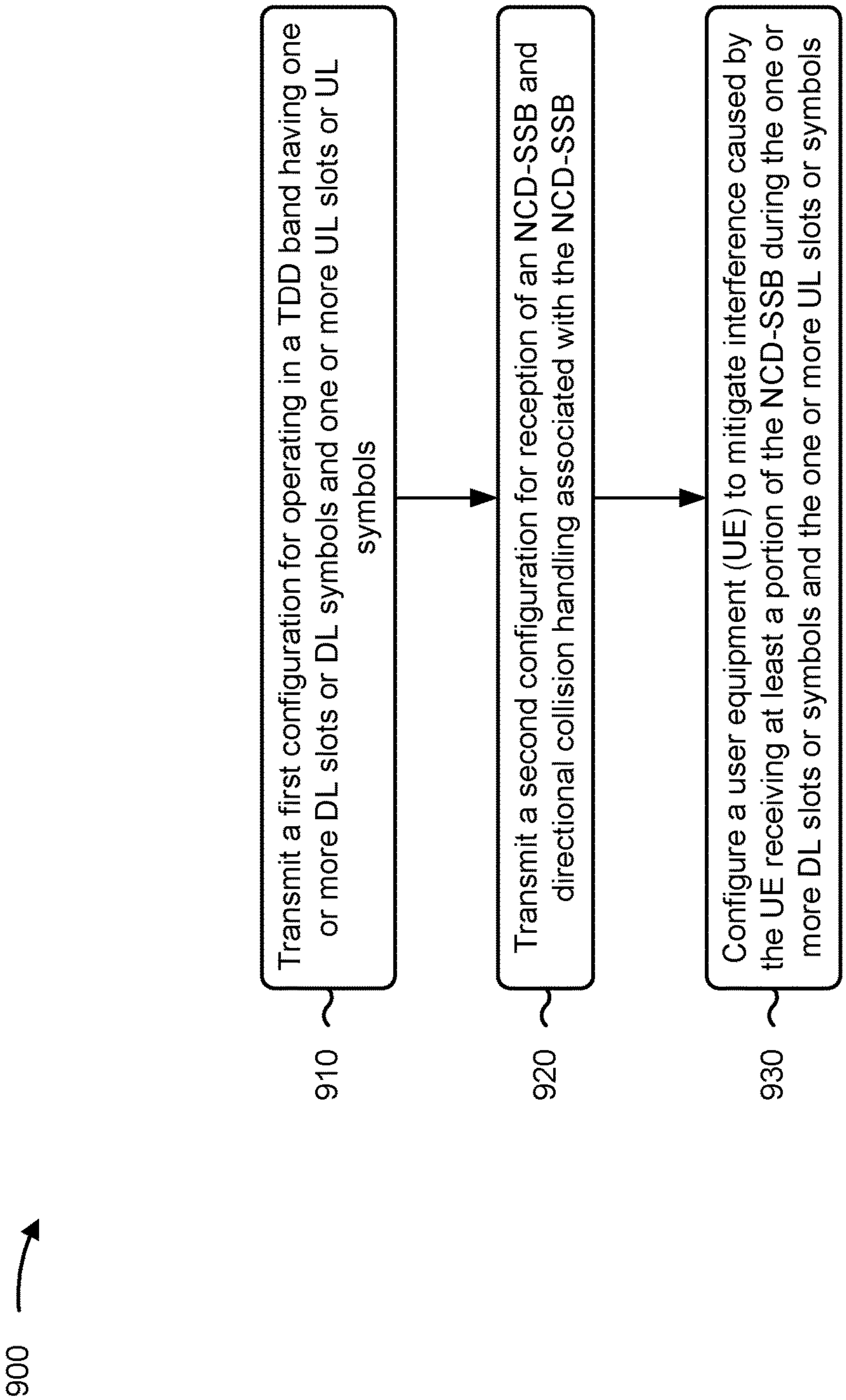
FIG. 9 is a flowchart illustrating an example process performed, for example, by a network node that supports directional collision handling for NCD-SSBs.

FIG. 9 is a flowchart illustrating an example process 800 performed, for example, at or by a network node that supports directional collision handling for NCD-SSBs. Example process 900 is an example where the network node (for example, network node 110 or an apparatus of the network node) performs operations associated with directional collision handling for NCD-SSBs.

As shown in FIG. 9, in some aspects, process 900 may include transmitting a first configuration for operating in a TDD band having one or more DL slots or DL symbols and one or more UL slots or UL symbols (block 910). For example, the UE (such as by using communication manager 140 or transmission component 1104, depicted in FIG. 11) may transmit the first configuration for operating in the TDD band having the one or more DL slots or DL symbols and the one or more UL slots or UL symbols, as described above.

As further shown in FIG. 9, in some aspects, process 900 may include receiving a second configuration for reception of an NCD-SSB and directional collision handling associated with the NCD-SSB (block 920). For example, the network node (such as by using communication manager 140 or transmission component 1104, depicted in FIG. 11) may receive the second configuration for reception of an NCD-SSB and directional collision handling associated with the NCD-SSB, as described above.

As further shown in FIG. 9, in some aspects, process 900 may include configuring the UE to mitigate interference caused by receiving at least a portion of the NCD-SSB during the one or more DL slots or symbols and the one or more UL slots or symbols (block 930). For example, the network node (such as by using communication manager 140 or mitigation component 1108, depicted in FIG. 11) may configure the UE to mitigate interference caused by receiving at least a portion of the NCD-SSB during the one or more DL slots or symbols and the one or more UL slots or symbols, as described above.

Process 900 may include additional aspects, such as any single aspect or any combination of aspects described below or in connection with one or more other processes described elsewhere herein.

In a first additional aspect, the second configuration for reception of the NCD-SSB includes a timing offset between the NCD-SSB and a reference CD-SSB, a periodicity of the NCD-SSB, a frequency mapping for the NCD-SSB, a time window for NCD-SSB configuration or activation signaling reception, or an application delay of the reception of the NCD-SSB after the time window.

In a second additional aspect, alone or in combination with the first aspect, the timing offset is a function of a periodicity of the reference CD-SSB.

In a third additional aspect, alone or in combination with one or more of the first and second aspects, the timing offset is the periodicity of the reference CD-SSB multiplied by an integer greater than or equal to zero.

In a fourth additional aspect, alone or in combination with one or more of the first through third aspects, the NCD-SSB is associated with an active DL BWP.

In a fifth additional aspect, alone or in combination with one or more of the first through fourth aspects, the active DL BWP is either an initial DL BWP of the UE after releasing an RRC connection or a dedicated DL BWP associated with an RRC connected mode of the UE.

In a sixth additional aspect, alone or in combination with one or more of the first through fifth aspects, the NCD-SSB is configured by a last serving cell after releasing a radio resource control connection.

In a seventh additional aspect, alone or in combination with one or more of the first through sixth aspects, process 900 includes transmitting an indication of a presence or activation of the NCD-SSB in an active DL bandwidth part of the UE.

In an eight additional aspect, alone or in combination with one or more of the first through seventh aspects, the indication of the presence or activation of the NCD-SSB is transmitted via RRC signaling, MAC-CE signaling, or DCI signaling.

In a ninth additional aspect, alone or in combination with one or more of the first through eight aspects, process 900 includes transmitting a network configuration for one of a time window, an application delay, or a CD-SSB associated with a time offset configuration, wherein the time window, the application delay, or the reference CD-SSB is associated with the presence or activation of the NCD-SSB.

In a tenth additional aspect, alone or in combination with one or more of the first through ninth aspects, the application delay is based, at least in part, on one or more of a frequency range, a reference numerology of an active DL BWP, a BWP switching delay, or a UE capability.

In an eleventh additional aspect, alone or in combination with one or more of the first through tenth aspects, process 900 includes transmitting a CD-SSB and SIBs; transmitting one or more of a UL resource configuration or UL activation or a DL resource configuration or DL activation in an active DL BWP; and transmitting scheduling information for UL transmissions in an active UL BWP, wherein the second configuration for directional collision handling associated with the NCD-SSB includes a set of rules for validating a resource in the active UL BWP and for transmitting a UL reference signal or a UL channel on the active UL BWP after validating the UL resource allocated for the UL reference signal or the UL channel.

In a twelfth additional aspect, alone or in combination with one or more of the first through eleventh aspects, the second configuration for directional collision handling associated with the NCD-SSB includes a set of rules for providing a gap between a first symbol or slot of a set of valid UL resources and a last symbol or slot of a DL reference signal or DL channel.

In a thirteenth additional aspect, alone or in combination with one or more of the first through twelfth aspects, process 900 includes transmitting CD-SSB signaling outside a first active DL bandwidth part including the NCD-SSB, transmitting the CD-SSB outside a second active DL BWP not including the NCD-SSB, or transmitting the NCD-SSB in a third active DL BWP including the NCD-SSB.

In a fourteenth additional aspect, alone or in combination with one or more of the first through thirteenth aspects, the first configuration for operating in the TDD band includes a set of valid UL resources associated with a transmit occasion or opportunity for a UL reference signal or UL channel, wherein the transmit occasion or opportunity spans one or more slots or sub-slots.

In a fifteenth additional aspect, alone or in combination with one or more of the first through fourteenth aspects, the set of valid UL resources is configured by system information or radio resource control signaling.

In a sixteenth additional aspect, alone or in combination with one or more of the first through fifteenth aspects, a presence or activation for the set of valid UL resources is indicated to a UE by system information, RRC signaling, MAC-CE signaling, or DCI signaling.

In a seventeenth additional aspect, alone or in combination with one or more of the first through sixteenth aspects, the set of valid UL resources starts after a last CD-SSB block transmitted by a serving cell, and a number of symbols between the last CD-SSB block and the set of valid UL resources is greater than or equal to a size of the gap.

In an eighteenth additional aspect, alone or in combination with one or more of the first through seventeenth aspects, a size of the gap is based, at least in part, on one or more of a frequency range, a duplex mode, a reference numerology of an active DL or UL bandwidth part, or a type, format, or waveform of a UL channel associated with the set of valid UL resources.

In a nineteenth additional aspect, alone or in combination with one or more of the first through eighteenth aspects, the second configuration for directional collision handling associated with the NCD-SSB includes a set of rules for applying a first timing offset or a second timing offset, wherein the first timing offset is a time between a last slot or symbol of a CD-SSB received from a serving cell and a first slot or symbol of a set of UL resources transmitted by the UE in an active UL BWP, and wherein the second timing offset is a time between a last slot or symbol associated with the NCD-SSB received from the serving cell in an active DL BWP and a first symbol of a flexible slot or a first symbol of a UL slot transmitted by the UE in the active UL BWP.

In a twentieth additional aspect, alone or in combination with one or more of the first through nineteenth aspects, the first timing offset is applied for UL resource validation in the active UL BWP as a result of an active DL BWP including the NCD-SSB and not a CD-SSB, the active DL BWP including the CD-SSB, or the active DL BWP not including either the NCD-SSB nor the CD-SSB.

In a twenty-first additional aspect, alone or in combination with one or more of the first through twentieth aspects, the first timing offset is applied as a result of the first timing offset being greater than or equal to a size of a gap between a first symbol or slot of a set of valid UL resources in an active UL BWP and a last symbol or slot of a set of valid DL resources, and further as a result of the NCD-SSB being configured or activated in an active downlink bandwidth part.

In a twenty-second additional aspect, alone or in combination with one or more of the first through twenty-first aspects, the second configuration for directional collision handling associated with the NCD-SSB includes a set of rules for validating a presence of the NCD-SSB in the active DL BWP before performing a measurement of the NCD-SSB on validated symbols of the NCD-SSB.

In a twenty-third additional aspect, alone or in combination with one or more of the first through twenty-second aspects, validating the presence of the NCD-SSB comprises validating the presence of the NCD-SSB based, at least in part, on one or more of the first configuration for operating in the TDD band or a timeline for receiving uplink scheduling information.

In a twenty-fourth additional aspect, alone or in combination with one or more of the first through twenty-third aspects, process 900 includes transmitting a cell-defining SSB; transmitting one or more of a UL configuration or activation or a DL configuration or DL activation in an active DL BWP; and transmitting network assistance information, wherein the first configuration for operating in the TDD band includes at least a cell-specific, group-specific, or UE-specific slot pattern indication for DL, UL, and flexible slots or symbols and a set of rules or scheduling information for UL communications on a set of UL slots or symbols and flexible symbols or slots.

In a twenty-fifth additional aspect, alone or in combination with one or more of the first through twenty-fourth aspects, process 900 includes transmitting a priority flag permitting or not permitting UE reception of the NCD-SSB on the set of flexible symbols or slots.

In a twenty-sixth additional aspect, alone or in combination with one or more of the first through twenty-fifth aspects, the priority flag is transmitted via one or more of RRC signaling, MAC-CE signaling, or SFI signaling.

In a twenty-seventh additional aspect, alone or in combination with one or more of the first through twenty-sixth aspects, process 900 includes transmitting the NCD-SSB on one or more of a set of DL slots or symbols or a set of flexible slots or symbols based, at least in part, on one or more of an indication of a priority flag, RRC signaling, MAC-CE signaling, or DCI signaling.

In a twenty-eighth additional aspect, alone or in combination with one or more of the first through twenty-seventh aspects, process 900 includes outputting an instruction for a UE to receive or skip reception of the NCD-SSB on the set of flexible slots or symbols.

In a twenty-ninth additional aspect, alone or in combination with one or more of the first through twenty-eighth aspects, process 900 includes outputting an instruction for a UE to receive the NCD-SSB as a result of a time duration between a last symbol of DCI or MAC-CE and a first symbol of a candidate NCD-SSB block being greater than or equal to a threshold.

Figure 10:
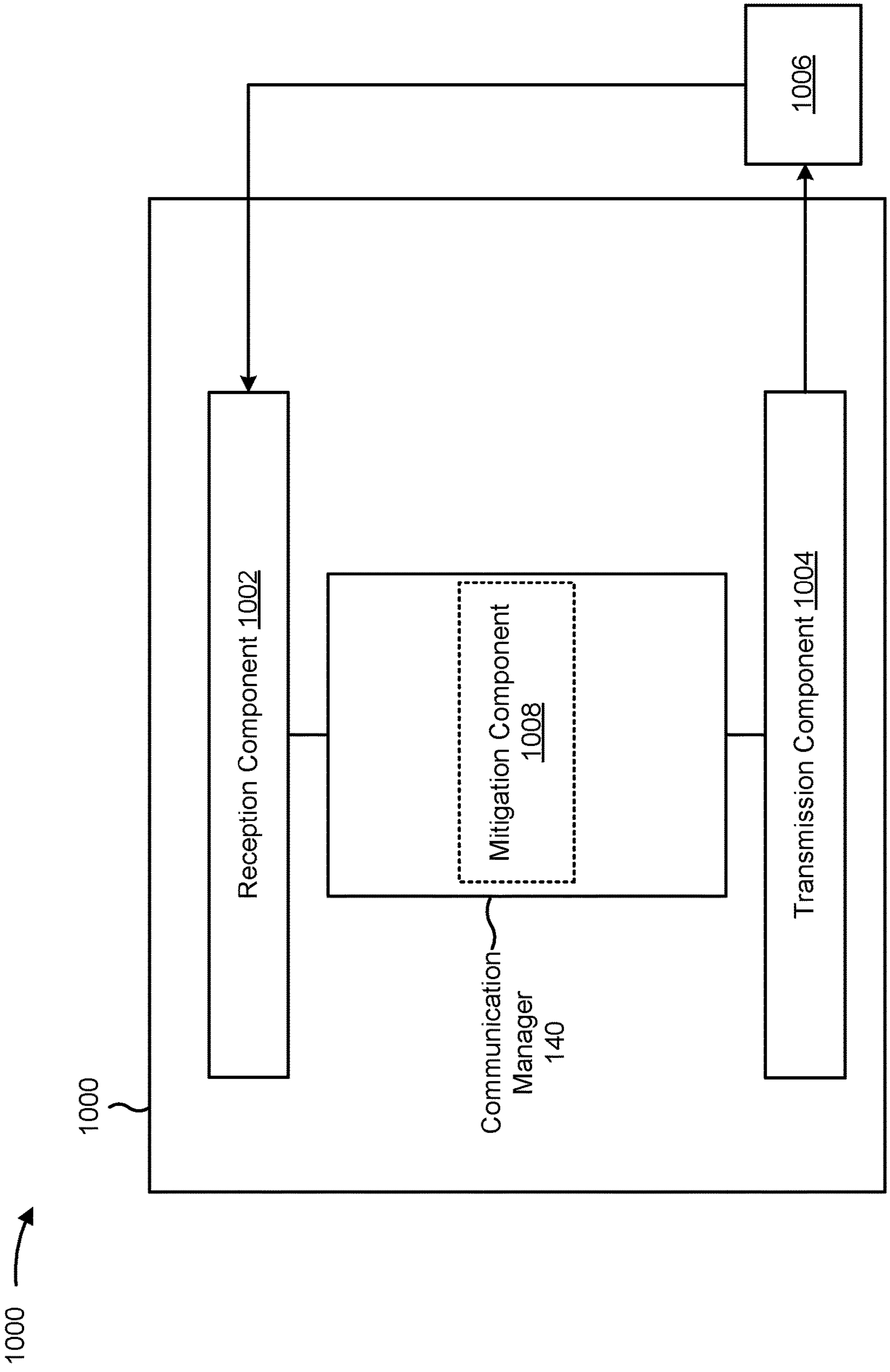
FIG. 10 is a diagram of one example apparatus for wireless communication that supports directional collision handling for NCD-SSBs.

FIG. 10 is a diagram of an example apparatus 1000 for wireless communication that supports directional collision handling for NCD-SSBs in accordance with the present disclosure. The apparatus 1000 may be a UE, or a UE may include the apparatus 1000. In some aspects, the apparatus 1000 includes a reception component 1002, a transmission component 1004, and a communication manager 140, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to and/or operable to perform one or more operations described herein in connection with FIGS. 3-7. Additionally or alternatively, the apparatus 1000 may be configured to and/or operable to perform one or more processes described herein, such as process 800 of FIG. 8. In some aspects, the apparatus 1000 may include one or more components of the UE described above in connection with FIG. 2.

The reception component 1002 may receive communications, such as reference signals, control information, and/or data communications, from the apparatus 1006. The reception component 1002 may provide received communications to one or more other components of the apparatus 1000, such as the communication manager 140. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, and/or a memory of the UE described above in connection with FIG. 2.

The transmission component 1004 may transmit communications, such as reference signals, control information, and/or data communications, to the apparatus 1006. In some aspects, the communication manager 140 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, and/or a memory of the UE described above in connection with FIG. 2. In some aspects, the transmission component 1004 may be co-located with the reception component 1002 in a transceiver.

The communication manager 140 may receive or may cause the reception component 1002 to receive a first configuration for operating in a TDD band having one or more DL slots or DL symbols and one or more uplink UL slots or UL symbols. The communication manager 140 may receive or may cause the reception component 1002 to receive a second configuration for reception of an NCD-SSB and directional collision handling associated with the NCD-SSB. The communication manager 140 may mitigate interference caused by receiving at least a portion of the NCD-SSB during the one or more DL slots or DL symbols and the one or more UL slots or UL symbols. In some aspects, the communication manager 140 may perform one or more operations described elsewhere herein as being performed by one or more components of the communication manager 140.

The communication manager 140 may include a controller/processor and a memory of the UE described above in connection with FIG. 2. In some aspects, the communication manager 140 includes a set of components, such as a mitigation component 1008. Alternatively, the set of components may be separate and distinct from the communication manager 140. In some aspects, one or more components of the set of components may include or may be implemented within a controller/processor and a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive a first configuration for operating in a TDD band having one or more DL slots or DL symbols and one or more UL slots or UL symbols. The reception component 1002 may receive a second configuration for reception of an NCD-SSB and directional collision handling associated with the NCD-SSB. The mitigation component 1008 may mitigate interference caused by receiving at least a portion of the NCD-SSB during the one or more DL slots or DL symbols and the one or more UL slots or UL symbols.

The reception component 1002 may receive an indication of a presence or activation of the NCD-SSB in an active DL bandwidth part of the UE.

The reception component 1002 may receive a network configuration for one of a time window, an application delay, or a reference CD-SSB associated with a time offset configuration, wherein the time window, the application delay, or the reference CD-SSB is associated with the presence or activation of the NCD-SSB.

The reception component 1002 may receive a CD-SSB and SIBs output by a serving cell.

The reception component 1002 may receive one or more of a UL resource configuration or UL activation or a DL resource configuration or DL activation in an active DL BWP.

The reception component 1002 may receive scheduling information for UL transmissions in an active UL BWP, wherein the second configuration for directional collision handling associated with the NCD-SSB includes a set of rules for validating a resource in the active UL BWP and for transmitting a UL reference signal or a UL channel on the active UL BWP after validating the UL resource allocated for the UL reference signal or the UL channel.

The reception component 1002 may receive a CD-SSB outside a first active DL bandwidth part including the NCD-SSB, receive the CD-SSB outside a second active DL BWP not including the NCD-SSB, or receive the NCD-SSB in a third active DL BWP including the NCD-SSB.

The reception component 1002 may receive a cell-defining SSB.

The reception component 1002 may receive one or more of a UL configuration or activation or a DL configuration or DL activation in an active DL BWP.

The reception component 1002 may receive network assistance information wherein the first configuration for operating in the TDD band includes at least a cell-specific, group-specific, or UE-specific slot pattern indication for DL, UL and flexible slots or symbols and a set of rules or scheduling information for UL communications on a set of UL slots or symbols and flexible symbols or slots.

The reception component 1002 may receive a priority flag permitting or not permitting UE reception of the NCD-SSB on the set of flexible symbols or slots.

The reception component 1002 may receive the NCD-SSB on one or more of a set of DL slots or symbols, or a set of flexible slots or symbols, based, at least in part, on one or more of an indication of a priority flag, RRC signaling, MAC-CE signaling, or DCI signaling.

The reception component 1002 may receive an instruction to receive or skip reception of the NCD-SSB on the set of flexible slots or symbols.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
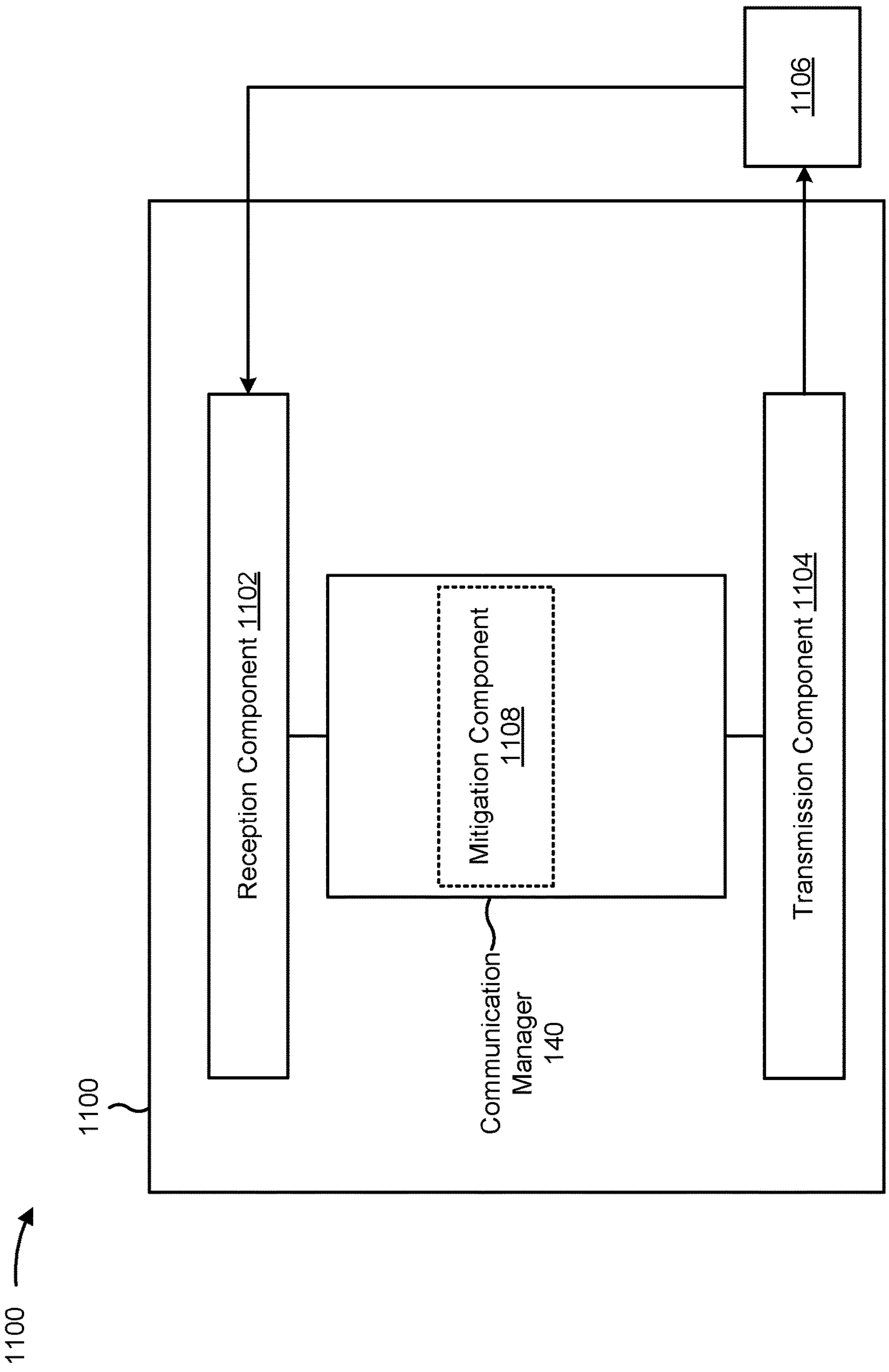
FIG. 11 is a diagram of another example apparatus for wireless communication that supports directional collision handling for NCD-SSBs.

FIG. 11 is a diagram of an example apparatus 1100 for wireless communication that supports directional collision handling for NCD-SSBs in accordance with the present disclosure. The apparatus 1100 may be a network node, or a network node may include the apparatus 1100. In some aspects, the apparatus 1100 includes a reception component 1102, a transmission component 1104, and a communication manager 150, which may be in communication with one another (for example, via one or more buses). As shown, the apparatus 1100 may communicate with another apparatus 1106 (such as a UE, a network node, or another wireless communication device) using the reception component 1102 and the transmission component 1104.

In some aspects, the apparatus 1100 may be configured to and/or operable to perform one or more operations described herein in connection with FIGS. 3-7.

Additionally or alternatively, the apparatus 1100 may be configured to and/or operable to perform one or more processes described herein, such as process 900 of FIG. 9. In some aspects, the apparatus 1100 may include one or more components of the network node described above in connection with FIG. 2.

The reception component 1102 may receive communications, such as reference signals, control information, and/or data communications, from the apparatus 1106. The reception component 1102 may provide received communications to one or more other components of the apparatus 1100, such as the communication manager 150. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a modem, a demodulator, a MIMO detector, a receive processor, a controller/processor, and/or a memory of the network node described above in connection with FIG. 2.

The transmission component 1104 may transmit communications, such as reference signals, control information, and/or data communications, to the apparatus 1106. In some aspects, the communication manager 150 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, and/or a memory of the network node described above in connection with FIG. 2. In some aspects, the transmission component 1104 may be co-located with the reception component 1102 in a transceiver.

The communication manager 150 may transmit or may cause the transmission component 1104 to transmit a first configuration for operating in a TDD band having one or more DL slots or DL symbols and one or more UL slots or UL symbols. The communication manager 150 may transmit or may cause the transmission component 1104 to transmit a second configuration for directional collision handling for NCD-SSB. The communication manager 150 may configure a UE to mitigate interference caused by the UE receiving at least a portion of the NCD-SSB during the one or more DL slots or DL symbols and the one or more UL slots or UL symbols. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a mitigation component 1108. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1104 may transmit a first configuration for operating in a TDD band having one or more DL slots or DL symbols and one or more UL slots or UL symbols. The transmission component 1104 may transmit a second configuration for directional collision handling for NCD-SSBs. The mitigation component 1108 may configure a UE to mitigate interference caused by the UE receiving at least a portion of the NCD-SSB during the one or more DL slots or DL symbols and the one or more UL slots or UL symbols.

The transmission component 1104 may transmit an indication of a presence or activation of the NCD-SSB in an active DL bandwidth part of the UE.

The transmission component 1104 may transmit a network configuration for one of a time window, an application delay, or a reference CD-SSB associated with a time offset configuration, wherein the time window, the application delay, or the reference CD-SSB is associated with the presence or activation of the NCD-SSB.

The transmission component 1104 may transmit a CD-SSB and SIBs.

The transmission component 1104 may transmit one or more of a UL resource configuration or UL activation or a DL resource configuration or DL activation in an active DL BWP.

The transmission component 1104 may transmit scheduling information for UL transmissions in an active UL BWP, wherein the second configuration for directional collision handling associated with the NCD-SSB includes a set of rules for validating a resource in the active UL BWP and for transmitting a UL reference signal or a UL channel on the active UL BWP after validating the UL resource allocated for the UL reference signal or the UL channel.

The transmission component 1104 may transmit a CD-SSB signaling outside a first active DL bandwidth part including the NCD-SSB, transmit the CD-SSB outside a second active DL BWP not including the NCD-SSB, or transmit the NCD-SSB in a third active DL BWP including the NCD-SSB.

The transmission component 1104 may transmit a cell-defining SSB.

The transmission component 1104 may transmit one or more of a UL configuration or activation or a DL configuration or DL activation in an active DL BWP.

The transmission component 1104 may transmit network assistance information, wherein the first configuration for operating in the TDD band includes at least a cell-specific, group specific, or UE-specific slot pattern indication for DL, UL, and flexible slots or symbols and a set of rules or scheduling information for UL communications on a set of UL slots or symbols and flexible symbols or slots.

The transmission component 1104 may transmit a priority flag permitting or not permitting UE reception of the NCD-SSB on the set of flexible symbols or slots.

The transmission component 1104 may transmit the NCD-SSB on one or more of a set of DL slots or symbols or a set of flexible slots or symbols based, at least in part, on one or more of an indication of a priority flag, RRC signaling, MAC-CE signaling, or DCI signaling.

The transmission component 1104 may output an instruction for a UE to receive or skip reception of the NCD-SSB on the set of flexible slots or symbols.

The transmission component 1104 may output an instruction for a UE to receive the NCD-SSB as a result of a time duration between a last symbol of DCI or a MAC-CE and a first symbol of a candidate NCD-SSB block being greater than or equal to a threshold.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving a first configuration for operating in a TDD band having one or more DL slots or DL symbols and one or more UL slots or UL symbols; and receiving a second configuration for reception of an NCD-SSB and directional collision handling associated with the NCD-SSB.

Aspect 2: The method of Aspect 1, wherein the second configuration for reception of the NCD-SSB includes a timing offset between the NCD-SSB and a reference CD-SSB, a periodicity of the NCD-SSB, a frequency mapping for the NCD-SSB, a time window for NCD-SSB configuration or activation signaling reception, or an application delay of the reception of the NCD-SSB after the time window.

Aspect 3: The method of Aspect 2, wherein the timing offset is a function of a periodicity of the reference CD-SSB.

Aspect 4: The method of Aspect 3, wherein the timing offset is the periodicity of the reference CD-SSB multiplied by an integer greater than or equal to zero.

Aspect 5: The method of any of Aspects 1-4, wherein the NCD-SSB is associated with an active DL BWP.

Aspect 6: The method of Aspect 5, wherein the active DL BWP is an initial DL BWP of the UE after releasing an RRC connection or a dedicated DL BWP associated with an RRC connected mode of the UE.

Aspect 7: The method of Aspect 5, wherein the NCD-SSB is configured by a last serving cell after releasing a radio resource control connection.

Aspect 8: The method of any of Aspects 1-7, further comprising receiving an indication of a presence or activation of the NCD-SSB in an active DL bandwidth part of the UE.

Aspect 9: The method of Aspect 8, wherein the indication of the presence or activation of the NCD-SSB is received via RRC signaling, MAC-CE signaling, or DCI.

Aspect 10: The method of Aspect 8, further comprising receiving a network configuration for one of a time window, an application delay, or a reference CD-SSB associated with a time offset configuration, wherein the time window, the application delay, or the reference CD-SSB is associated with the presence or activation of the NCD-SSB.

Aspect 11: The method of Aspect 10, wherein the application delay is based, at least in part, on one or more of a frequency range, a reference numerology of an active downlink BWP, a BWP switching delay, or a UE capability.

Aspect 12: The method of any of Aspects 1-11, further comprising: receiving a CD-SSB and SIBs output by a serving cell; receiving one or more of a UL resource configuration or UL activation or a DL resource configuration or DL activation in an active DL BWP; and receiving scheduling information for UL transmissions in an active UL BWP, wherein the second configuration for directional collision handling associated with the NCD-SSB includes a set of rules for validating a resource in the active UL BWP and for transmitting a UL reference signal or a UL channel on the active UL BWP after validating the UL resource allocated for the UL reference signal or the UL channel.

Aspect 13: The method of any of Aspects 1-12, wherein the second configuration for directional collision handling associated with the NCD-SSB includes a set of rules for providing a gap between a first symbol or slot of a set of valid UL resources and a last symbol or slot of a DL reference signal or DL channel.

Aspect 14: The method of Aspect 13, further comprising receiving a CD-SSB outside a first active DL bandwidth part including the NCD-SSB, receiving the CD-SSB outside a second active DL BWP not including the NCD-SSB, or receiving the NCD-SSB in a third active DL BWP including the NCD-SSB.

Aspect 15: The method of Aspect 13, wherein the first configuration for operating in the TDD band includes a set of valid UL resources associated with a transmit occasion or opportunity for a UL reference signal or UL channel, wherein the transmit occasion or opportunity spans one or more slots or sub-slots.

Aspect 16: The method of Aspect 15, wherein the set of valid UL resources is configured by system information or radio resource control signaling.

Aspect 17: The method of Aspect 15, wherein a presence or activation for the set of valid UL resources is indicated to the UE by system information, RRC signaling, MAC-CE signaling, or downlink control information signaling.

Aspect 18: The method of Aspect 15, wherein the set of valid UL resources starts after a last CD-SSB block transmitted by a serving cell, and wherein a number of symbols between the last CD-SSB block and the set of valid UL resources is greater than or equal to a size of the gap.

Aspect 19: The method of Aspect 13, wherein a size of the gap is based, at least in part, on one or more of a frequency range, a duplex mode, a reference numerology of an active DL or UL bandwidth part, or a type, format, or waveform of a UL channel associated with the set of valid UL resources.

Aspect 20: The method of any of Aspects 1-19, wherein the second configuration for directional collision handling associated with the NCD-SSB includes a set of rules for applying a first timing offset or a second timing offset, wherein the first timing offset is a time between a last slot or symbol of a CD-SSB received from a serving cell and a first slot or symbol of a set of UL resources transmitted by the UE in an active UL BWP and wherein the second timing offset is a time between a last slot or symbol associated with the NCD-SSB received from the serving cell in an active DL BWP and a first symbol of a flexible slot or a first symbol of a UL slot transmitted by the UE in the active UL BWP.

Aspect 21: The method of Aspect 20, wherein the first timing offset is applied for UL resource validation in the active UL BWP as a result of an active DL BWP including the NCD-SSB and not a CD-SSB, the active DL BWP including the CD-SSB, or the active DL BWP not including either the NCD-SSB nor the CD-SSB.

Aspect 22: The method of Aspect 20, wherein the first timing offset is applied as a result of the first timing offset being greater than or equal to a size of a gap between a first symbol or slot of a set of valid UL resources in the active UL BWP and a last symbol or slot of a set of valid DL resources and further as a result of the NCD-SSB being configured or activated in an active downlink bandwidth part.

Aspect 23: The method of any of Aspects 1-22, wherein the second configuration for directional collision handling associated with the NCD-SSB includes a set of rules for validating a presence of the NCD-SSB in an active DL BWP before performing a measurement of the NCD-SSB on validated symbols of the NCD-SSB.

Aspect 24: The method of Aspect 23, wherein validating the presence of the NCD-SSB comprises validating the presence of the NCD-SSB based, at least in part, on one or more of the first configuration for operating in the TDD band or a timeline for receiving uplink scheduling information.

Aspect 25: The method of any of Aspects 1-24, further comprising: receiving a cell-defining SSB; receiving one or more of a UL configuration or activation or a DL configuration or DL activation in an active DL BWP; and receiving network assistance information, wherein the first configuration for operating in the TDD band includes at least a cell-specific, group-specific, or UE-specific slot pattern indication for DL, UL and flexible slots or symbols and a set of rules or scheduling information for UL communications on a set of UL slots or symbols and flexible symbols or slots.

Aspect 26: The method of Aspect 25, further comprising receiving a priority flag permitting or not permitting UE reception of the NCD-SSB on the set of flexible symbols or slots.

Aspect 27: The method of Aspect 26, wherein the priority flag is received via one or more of RRC signaling, MAC-CE signaling, SFI signaling.

Aspect 28: The method of Aspect 25, further comprising receiving the NCD-SSB on one or more of a set of DL slots or symbols, or a set of flexible slots or symbols, based, at least in part, on one or more of an indication of a priority flag, RRC signaling, MAC-CE signaling, or DCI signaling.

Aspect 29: The method of Aspect 28, further comprising receiving an instruction to receive or skip reception of the NCD-SSB on the set of flexible slots or symbols.

Aspect 30: The method of Aspect 28, wherein receiving the NCD-SSB is a result of a time duration between a last symbol of DCI or MAC-CE and a first symbol of a candidate NCD-SSB block being greater than or equal to a threshold.

Aspect 31: A method of wireless communication performed by a network node, comprising: transmitting a first configuration for operating in a TDD band having one or more DL slots or DL symbols and one or more UL slots or UL symbols; transmitting a second configuration for directional collision handling for NCD-SSB; and configuring a UE to mitigate interference caused by the UE receiving at least a portion of the NCD-SSB during the one or more DL slots or DL symbols and the one or more UL slots or UL symbols.

Aspect 32: The method of Aspect 31, wherein the second configuration for reception of the NCD-SSB includes a timing offset between the NCD-SSB and a reference CD-SSB, a periodicity of the NCD-SSB, a frequency mapping for the NCD-SSB, a time window for NCD-SSB configuration or activation signaling reception, or an application delay of the reception of the NCD-SSB after the time window.

Aspect 33: The method of Aspect 32, wherein the timing offset is a function of a periodicity of the reference CD-SSB.

Aspect 34: The method of Aspect 33, wherein the timing offset is the periodicity of the reference CD-SSB multiplied by an integer greater than or equal to zero.

Aspect 35: The method of any of Aspects 31-34, wherein the NCD-SSB is associated with an active DL BWP.

Aspect 36: The method of Aspect 35, wherein the active DL BWP is an initial DL BWP of the UE after releasing an RRC connection or a dedicated DL BWP associated with an RRC connected mode of the UE.

Aspect 37: The method of Aspect 35, wherein the NCD-SSB is configured by a last serving cell after releasing a radio resource control connection.

Aspect 38: The method of any of Aspects 31-37, further comprising transmitting an indication of a presence or activation of the NCD-SSB in an active DL bandwidth part of the UE.

Aspect 39: The method of Aspect 38, wherein the indication of the presence or activation of the NCD-SSB is transmitted via RRC signaling, MAC-CE signaling, or DCI signaling.

Aspect 40: The method of Aspect 38, further comprising transmitting a network configuration for one of a time window, an application delay, or a reference CD-SSB associated with a time offset configuration, wherein the time window, the application delay, or the reference CD-SSB is associated with the presence or activation of the NCD-SSB.

Aspect 41: The method of Aspect 40, wherein the application delay is based, at least in part, on one or more of a frequency range, a reference numerology of an active DL BWP, a BWP switching delay, or a UE capability.

Aspect 42: The method of any of Aspects 31-41, further comprising: transmitting a CD-SSB and SIBs; transmitting one or more of a UL resource configuration or UL activation or a DL resource configuration or DL activation in an active DL BWP; and transmitting scheduling information for UL transmissions in an active UL BWP, wherein the second configuration for directional collision handling associated with the NCD-SSB includes a set of rules for validating a resource in the active UL BWP and for transmitting a UL reference signal or a UL channel on the active UL BWP after validating the UL resource allocated for the UL reference signal or the UL channel.

Aspect 43: The method of any of Aspects 31-42, wherein the second configuration for directional collision handling associated with the NCD-SSB includes a set of rules for providing a gap between a first symbol or slot of a set of valid UL resources and a last symbol or slot of a DL reference signal or DL channel.

Aspect 44: The method of Aspect 43, further comprising transmitting a CD-SSB signaling outside a first active DL bandwidth part including the NCD-SSB, transmitting the CD-SSB outside a second active DL BWP not including the NCD-SSB, or transmitting the NCD-SSB in a third active DL BWP including the NCD-SSB.

Aspect 45: The method of Aspect 43, wherein the first configuration for operating in the TDD band includes a set of valid UL resources associated with a transmit occasion or opportunity for a UL reference signal or UL channel, wherein the transmit occasion or opportunity spans one or more slots or sub-slots.

Aspect 46: The method of Aspect 45, wherein the set of valid UL resources is configured by system information or radio resource control signaling.

Aspect 47: The method of Aspect 45, wherein a presence or activation for the set of valid UL resources is indicated to a user equipment by system information, RRC signaling, MAC-CE signaling, or DCI signaling.

Aspect 48: The method of Aspect 45, wherein the set of valid UL resources starts after a last CD-SSB block transmitted by a serving cell, and wherein a number of symbols between the last CD-SSB block and the set of valid UL resources is greater than or equal to a size of the gap.

Aspect 49: The method of Aspect 43, wherein a size of the gap is based, at least in part, on one or more of a frequency range, a duplex mode, a reference numerology of an active DL or UL bandwidth part, or a type, format, or waveform of a UL channel associated with the set of valid UL resources.

Aspect 50: The method of any of Aspects 31-49, wherein the second configuration for directional collision handling associated with the NCD-SSB includes a set of rules for applying a first timing offset or a second timing offset, wherein the first timing offset is a time between a last slot or symbol of a CD-SSB received from a serving cell and a first slot or symbol of a set of UL resources transmitted by the UE in an active UL BWP, and wherein the second timing offset is a time between a last slot or symbol associated with the NCD-SSB received from the serving cell in an active DL BWP and a first symbol of a flexible slot or a first symbol of a UL slot transmitted by the UE in the active UL BWP.

Aspect 51: The method of Aspect 50, wherein the first timing offset is applied for UL resource validation in the active UL BWP as a result of an active DL BWP including the NCD-SSB and not a CD-SSB, the active DL BWP including the CD-SSB, or the active DL BWP not including either the NCD-SSB nor the CD-SSB.

Aspect 52: The method of Aspect 50, wherein the first timing offset is applied as a result of the first timing offset being greater than or equal to a size of a gap between a first symbol or slot of a set of valid UL resources in an active UL BWP and a last symbol or slot of a set of valid DL resources and further as a result of the NCD-SSB being configured or activated in an active downlink bandwidth part.

Aspect 53: The method of any of Aspects 31-52, wherein the second configuration for directional collision handling associated with the NCD-SSB includes a set of rules for validating a presence of the NCD-SSB in the active DL BWP before performing a measurement of the NCD-SSB on validated symbols of the NCD-SSB.

Aspect 54: The method of Aspect 53, wherein validating the presence of the NCD-SSB comprises validating the presence of the NCD-SSB based, at least in part, on one or more of the first configuration for operating in the TDD band or a timeline for receiving uplink scheduling information.

Aspect 55: The method of any of Aspects 31-54, further comprising: transmitting a cell-defining SSB; transmitting one or more of a UL configuration or activation or a DL configuration or DL activation in an active DL bandwidth part (BWP); and transmitting network assistance information, wherein the first configuration for operating in the TDD band includes at least a cell-specific, group specific, or UE-specific slot pattern indication for DL, UL, and flexible slots or symbols and a set of rules or scheduling information for UL communications on a set of UL slots or symbols and flexible symbols or slots.

Aspect 56: The method of Aspect 55, further comprising transmitting a priority flag permitting or not permitting UE reception of the NCD-SSB on the set of flexible symbols or slots.

Aspect 57: The method of Aspect 56, wherein the priority flag is transmitted via one or more of radio resource control signaling, medium access control (MAC) control element signaling, or slot format indicator signaling.

Aspect 58: The method of Aspect 55, further comprising transmitting the NCD-SSB on one or more of a set of DL slots or symbols or a set of flexible slots or symbols based, at least in part, on one or more of an indication of a priority flag, RRC signaling, MAC-CE signaling, or DCI signaling.

Aspect 59: The method of Aspect 58, further comprising outputting an instruction for a user equipment to receive or skip reception of the NCD-SSB on the set of flexible slots or symbols.

Aspect 60: The method of Aspect 58, further comprising outputting an instruction for a user equipment to receive the NCD-SSB as a result of a time duration between a last symbol of DCI or MAC-CE and a first symbol of a candidate NCD-SSB block being greater than or equal to a threshold.

Aspect 61: An apparatus for wireless communication at a device, comprising a processor; memory coupled with the processor; and instructions stored in the memory and executable by the processor to cause the apparatus to perform the method of one or more of Aspects 1-60.

Aspect 62: A device for wireless communication, comprising a memory and one or more processors coupled to the memory, the one or more processors configured to perform the method of one or more of Aspects 1-60.

Aspect 63: An apparatus for wireless communication, comprising at least one means for performing the method of one or more of Aspects 1-60.

Aspect 64: A non-transitory computer-readable medium storing code for wireless communication, the code comprising instructions executable by a processor to perform the method of one or more of Aspects 1-60.

Aspect 65: A non-transitory computer-readable medium storing a set of instructions for wireless communication, the set of instructions comprising one or more instructions that, when executed by one or more processors of a device, cause the device to perform the method of one or more of Aspects 1-60.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), identifying, inferring, ascertaining, measuring, and the like. Also, "determining" can include receiving (such as receiving information or receiving an indication), accessing (such as accessing data stored in memory), transmitting (such as transmitting information) and the like. Also, "determining" can include resolving, selecting, obtaining, choosing, establishing and other such similar actions.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (for example, if used in combination with "either" or "only one of").

What is claimed is:

1. An apparatus for wireless communication at a user equipment (UE), comprising:

at least one memory; and at least one processor coupled with the at least one memory, the at least one processor operable to cause the UE to:

receive a first configuration for operating in a time division duplexing (TDD) band having one or more downlink (DL) slots or DL symbols and one or more uplink (UL) slots or UL symbols; and receive a second configuration for reception of a non-cell-defining (NCD) synchronization signal and physical broadcast channel block (SSB) (NCD-SSB) and directional collision handling associated with the NCD-SSB.

2. The apparatus of claim 1, wherein the second configuration for reception of the NCD-SSB includes a timing offset between the NCD-SSB and a reference cell-defining SSB (CD-SSB), a periodicity of the NCD-SSB, a frequency mapping for the NCD-SSB, a time window for NCD-SSB configuration or activation signaling reception, or an application delay of the reception of the NCD-SSB after the time window.

3. The apparatus of claim 2, wherein the timing offset is a function of a periodicity of the reference CD-SSB or the periodicity of the reference CD-SSB multiplied by an integer greater than or equal to zero.

4. The apparatus of claim 1, wherein the NCD-SSB is associated with an active DL bandwidth part (BWP), wherein:

the active DL BWP is an initial DL BWP of the UE after releasing a radio resource control (RRC) connection or a dedicated DL BWP associated with an RRC connected mode of the UE, or the NCD-SSB is configured by a last serving cell after releasing a radio resource control connection.

5. The apparatus of claim 1, wherein the at least one processor is further operable to cause the UE to receive an indication of a presence or activation of the NCD-SSB in an active DL bandwidth part of the UE via radio resource control (RRC) signaling, medium access control (MAC) control element (MAC-CE) signaling, or downlink control information (DCI), wherein the at least one processor is further operable to cause the UE to receive a network configuration for one of a time window, an application delay, or a reference cell-defining SSB (CD-SSB) associated with a time offset configuration, wherein the time window, the application delay, or the reference CD-SSB is associated with the presence or activation of the NCD-SSB, and wherein the application delay is based, at least in part, on one or more of a frequency range, a reference numerology of an active downlink bandwidth part (BWP), a BWP switching delay, or a UE capability.

6. The apparatus of claim 1, wherein the at least one processor is further operable to cause the UE to:

receive a cell-defining SSB (CD-SSB) and system information blocks (SIBs) output by a serving cell;

receive one or more of a UL resource configuration or UL activation or a DL resource configuration or DL activation in an active DL bandwidth part (BWP); and receive scheduling information for UL transmissions in an active UL BWP, wherein the second configuration for directional collision handling associated with the NCD-SSB includes a set of rules for validating a resource in the active UL BWP and for transmitting a UL reference signal or a UL channel on the active UL BWP after validating the UL resource allocated for the UL reference signal or the UL channel.

7. The apparatus of claim 1, wherein the second configuration for directional collision handling associated with the NCD-SSB includes a set of rules for applying a first timing offset or a second timing offset, wherein the first timing offset is a time between a last slot or symbol of a cell-defining SSB (CD-SSB) received from a serving cell and a first slot or symbol of a set of UL resources transmitted by the UE in an active UL bandwidth part (BWP) and wherein the second timing offset is a time between a last slot or symbol associated with the NCD-SSB received from the serving cell in an active DL BWP and a first symbol of a flexible slot or a first symbol of a UL slot transmitted by the UE in the active UL BWP.

8. The apparatus of claim 7, wherein the first timing offset is applied for UL resource validation in the active UL BWP as a result of an active DL bandwidth part (BWP) including the NCD-SSB and not a cell-defining SSB (CD-SSB), the active DL BWP including the CD-SSB, or the active DL BWP not including either the NCD-SSB nor the CD-SSB.

9. The apparatus of claim 7, wherein the first timing offset is applied as a result of the first timing offset being greater than or equal to a size of a gap between a first symbol or slot of a set of valid UL resources in the active UL BWP and a last symbol or slot of a set of valid DL resources and further as a result of the NCD-SSB being configured or activated in an active downlink bandwidth part.

10. The apparatus of claim 1, wherein the second configuration for directional collision handling associated with the NCD-SSB includes a set of rules for validating a presence of the NCD-SSB in an active DL BWP before performing a measurement of the NCD-SSB on validated symbols of the NCD-SSB.

11. The apparatus of claim 10, wherein the at least one processor is further operable to cause the UE to validate the presence of the NCD-SSB based, at least in part, on one or more of the first configuration for operating in the TDD band or a timeline for receiving uplink scheduling information.

12. An apparatus of wireless communication at a network node, comprising:

at least one memory; and at least one processor coupled with the at least one memory, the at least one processor operable to cause the network node to:

transmit a first configuration for operating in a time division duplexing (TDD) band having one or more downlink (DL) slots or DL symbols and one or more uplink (UL) slots or UL symbols; and transmit a second configuration for directional collision handling for non-cell-defining (NCD) synchronization signal block (SSB) (NCD-SSB).

13. The apparatus of claim 12, wherein the second configuration for reception of the NCD-SSB includes a timing offset between the NCD-SSB and a reference cell-defining SSB (CD-SSB), a periodicity of the NCD-SSB, a frequency mapping for the NCD-SSB, a time window for NCD-SSB configuration or activation signaling reception, or an application delay of the reception of the NCD-SSB after the time window.

14. The apparatus of claim 12, wherein the at least one processor is further operable to cause the network node to:

transmit a cell-defining SSB (CD-SSB) and system information blocks (SIBs);

transmit one or more of a UL resource configuration or UL activation or a DL resource configuration or DL activation in an active DL bandwidth part (BWP); and transmit scheduling information for UL transmissions in an active UL BWP, wherein the second configuration for directional collision handling associated with the NCD-SSB includes a set of rules for validating a resource in the active UL BWP and for transmitting a UL reference signal or a UL channel on the active UL BWP after validating the UL resource allocated for the UL reference signal or the UL channel.

15. The apparatus of claim 12, wherein the second configuration for directional collision handling associated with the NCD-SSB includes a set of rules for applying a first timing offset or a second timing offset, wherein the first timing offset is a time between a last slot or symbol of a cell-defining SSB (CD-SSB) received from a serving cell and a first slot or symbol of a set of UL resources transmitted in an active UL bandwidth part (BWP), and wherein the second timing offset is a time between a last slot or symbol associated with the NCD-SSB received from the serving cell in an active DL BWP and a first symbol of a flexible slot or a first symbol of a UL slot transmitted in the active UL BWP.

16. The apparatus of claim 15, wherein the first timing offset is applied for UL resource validation in the active UL BWP as a result of an active DL bandwidth part (BWP) including the NCD-SSB and not a cell-defining SSB (CD-SSB), the active DL BWP including the CD-SSB, or the active DL BWP not including either the NCD-SSB nor the CD-SSB.

17. The apparatus of claim 15, wherein the first timing offset is applied as a result of the first timing offset being greater than or equal to a size of a gap between a first symbol or slot of a set of valid UL resources in an active UL BWP and a last symbol or slot of a set of valid DL resources and further as a result of the NCD-SSB being configured or activated in an active downlink bandwidth part.

18. The apparatus of claim 12, wherein the second configuration for directional collision handling associated with the NCD-SSB includes a set of rules for validating a presence of the NCD-SSB in an active DL BWP before performing a measurement of the NCD-SSB on validated symbols of the NCD-SSB.

19. The apparatus of claim 18, wherein the at least one processor is further operable to cause the network node to configure a user equipment (UE) to validate the presence of the NCD-SSB based, at least in part, on one or more of the first configuration for operating in the TDD band or a timeline for receiving uplink scheduling information.

20. A method of wireless communication performed by a user equipment (UE), comprising:

receiving a first configuration for operating in a time division duplexing (TDD) band having one or more downlink (DL) slots or DL symbols and one or more uplink (UL) slots or UL symbols; and receiving a second configuration for reception of a non-cell-defining (NCD) synchronization signal and physical broadcast channel block (SSB) (NCD-SSB) and directional collision handling associated with the NCD-SSB.

* * * * *